(12) United States Patent
Aikawa

(10) Patent No.: US 11,584,258 B2
(45) Date of Patent: Feb. 21, 2023

(54) COOLING SYSTEM

(71) Applicant: TOYOTA JIDOSHA KABUSHIKI KAISHA, Toyota (JP)

(72) Inventor: Hidefumi Aikawa, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 345 days.

(21) Appl. No.: 17/022,762

(22) Filed: Sep. 16, 2020

(65) Prior Publication Data

US 2021/0094443 A1 Apr. 1, 2021

(30) Foreign Application Priority Data

Sep. 30, 2019 (JP) .............................. JP2019-179737

(51) Int. Cl.
*B60L 58/26* (2019.01)
*B60H 1/00* (2006.01)
*B60K 1/00* (2006.01)

(52) U.S. Cl.
CPC .......... *B60L 58/26* (2019.02); *B60H 1/00278* (2013.01); *B60H 2001/00307* (2013.01); *B60K 2001/005* (2013.01)

(58) Field of Classification Search
CPC .............. B60L 58/26; B60L 2240/525; B60L 2240/545; B60H 1/00278; B60H 2001/00307; B60H 1/143; B60H 1/32284; B60H 1/00271; B60H 1/004; B60H 1/3204; B60H 1/00028; B60H 1/00342; B60H 1/03; B60K 2001/005; B60K 1/00; B60K 11/02; B60K 2001/003; B60K 2001/006; Y02T 10/70

USPC ........................................................... 62/239
See application file for complete search history.

(56) References Cited

U.S. PATENT DOCUMENTS

| | | | |
|---|---|---|---|
| 8,997,503 B2* | 4/2015 | Morisita ................ | B60H 1/039 62/243 |
| 10,220,681 B2* | 3/2019 | Katoh ................ | B60H 1/32284 |
| 2012/0297805 A1* | 11/2012 | Kamada ............ | B60H 1/32281 62/208 |
| 2013/0081419 A1* | 4/2013 | Katoh ................... | F25B 47/025 62/278 |

(Continued)

FOREIGN PATENT DOCUMENTS

| JP | 2019-034587 A | 3/2019 |
|---|---|---|
| JP | 2019-043262 A | 3/2019 |

*Primary Examiner* — Len Tran
*Assistant Examiner* — Gustavo A Hincapie Serna
(74) *Attorney, Agent, or Firm* — Oliff PLC

(57) ABSTRACT

A cooling system includes a shared path; a first path connected to the shared path and having a first pump and a first heat exchanger exchanging heat with an inverter; a second path connected to the shared path in parallel with the first path and having a second pump and a second heat exchanger exchanging heat with a battery. The first and second paths are configured to be able to switch a flow state between a first state where the heat media flow through the shared path, and a second state where one of the heat media does not flow through the shared path. The control device controls the outputs of the pumps so that when switching the flow state between the first and second states, flow rate of the heat medium flowing through the first path becomes temporarily larger than the target flow rate.

12 Claims, 29 Drawing Sheets

(56) References Cited

U.S. PATENT DOCUMENTS

| | | | |
|---|---|---|---|
| 2015/0210141 A1* | 7/2015 | Ragazzi | B60H 1/00899 |
| | | | 62/93 |
| 2016/0221413 A1* | 8/2016 | Gebbie | B60H 1/00921 |
| 2016/0318370 A1* | 11/2016 | Rawlinson | B60H 1/32281 |
| 2017/0021698 A1* | 1/2017 | Hatakeyama | F25B 25/005 |
| 2018/0264913 A1* | 9/2018 | Enomoto | B60H 1/32284 |
| 2018/0354344 A1* | 12/2018 | Miura | B60H 1/08 |
| 2018/0361825 A1* | 12/2018 | Porras | B60H 1/00914 |
| 2019/0047363 A1* | 2/2019 | Sonnekalb | B60H 1/00371 |
| 2019/0070951 A1* | 3/2019 | Lucke | B60H 1/32281 |

* cited by examiner

PCU FLOW PATH TARGET FLOW RATE

BATTERY FLOW PATH TARGET FLOW RATE

COOLING SYSTEM

FIELD

The present disclosure relates to a cooling system.

BACKGROUND

Known since the past has been a cooling system for cooling an inverter and a battery connected to a motor driving a vehicle (for example, PTL 1). In particular, the cooling system described in PTL 1 is provided with a first flow path connected to a radiator and having a heat exchanger for inverter and a first pump, and a second flow path connected to the same radiator in parallel with the first flow path and having a heat exchanger for battery and a second pump.

In addition, the cooling system described in PTL 1 is configured to be able to be switch between a state connecting the first flow path with the radiator and a state not connecting it. Similarly, it is configured to be able to switch between a state connecting the second flow path with the radiator and a state not connecting it.

CITATIONS LIST

Patent Literature

[PTL 1] Japanese Unexamined Patent Publication No. 2019-034587

SUMMARY

Technical Problem

In this regard, an inverter rapidly generates heat according to the load of the motor. Along with this, sometimes the temperature rapidly rises. To prevent the inverter from excessively rising in temperature even if the inverter rapidly generates heat in this way, it is necessary to constantly run equal to or greater than a certain flow rate of a heat medium to the heat exchanger for inverter.

On the other hand, if, like in the cooling system described in PTL 1, two flow paths of a first flow path and a second flow path are connected in parallel with respect to a shared flow path, the flow rate of the heat medium flowing through the first flow path changes in accordance with the states of connection of the first flow path and second flow path with the shared flow path. For this reason, when switching the states of connection of the first flow path and second flow path with the shared flow path, sometimes the flow rate of the heat medium flowing through the first flow path excessively decreases. As a result, in such a case, if the inverter rapidly generates heat, the temperature of the inverter is liable to excessively rise.

In view of the above problem, an object of the present disclosure is to provide a cooling system able to suppress an excessive rise in temperature of the inverter.

Solution to Problem

The present disclosure has as its gist the following.

(1) A cooling system mounted in a vehicle provided with a motor for driving the vehicle, an inverter for controlling the motor, and a battery for supplying electric power to the motor, the cooling system comprising:

a shared flow path;

a first flow path connected to the shared flow path and having a first pump and a first heat exchanger exchanging heat with the inverter, wherein when the first pump is operating, a heat medium circulates through the first heat exchanger;

a second flow path connected to the shared flow path in parallel with the first flow path and having a second pump and a second heat exchanger exchanging heat with the battery, wherein when the second pump is operating, the heat medium circulates through the second heat exchanger; and a control device controlling operations of the first pump and the second pump, wherein the first flow path and the second flow path are configured to be able to switch a flow state between a first state where the heat media flowing through the first flow path and the second flow path both flow through the shared flow path, and a second state where at least one of the heat media flowing through the first flow path and the second flow path does not flow through the shared flow path, and wherein the control device controls the outputs of the first pump and the second pump so that when switching the flow state between the first state and the second state, flow rate of the heat medium flowing through the first flow path becomes temporarily larger than the target flow rate.

(2) The cooling system according to above (1), wherein the control device controls the outputs of the first pump and the second pump so that when switching the flow state from the first state to the second state, the flow rate of the heat medium flowing through the first flow path after switching the flow state temporarily becomes larger than the target flow rate after switching the flow state, and when switching the flow state from the second state to the first state, the flow rate of the heat medium flowing through the first flow path before switching the flow state temporarily becomes larger than the target flow rate after switching the flow state.

(3) The cooling system according to above (1) or (2), wherein when switching the flow state from the second state to the first state, the control device switches the flow state after raising the output of the first pump.

(4) The cooling system according to any one of above (1) to (3), wherein when switching the flow state from the first state to the second state, the control device lowers the output of the first pump after switching the flow state.

(5) The cooling system according to any one of above (1) to (4), wherein the shared flow path is provided with a radiator exchanging heat with the outside air.

(6) The cooling system according to above (5), further comprising a first bypass flow path connected to the first flow path so as to bypass the shared flow path, and a first switching valve able to switch the flow path through which the heat medium flowing through the first heat exchanger flows, between the shared flow path and the first bypass flow path.

(7) The cooling system according to above (6), wherein when switching the flow path through which the heat medium flowing through the first heat exchanger flows by the first switching valve between the shared flow path and the first bypass flow path, the control device controls the output of the first pump so that the flow rate of the heat medium flowing through the first flow path temporarily becomes larger than the target flow rate.

(8) The cooling system according to above (7), wherein when raising the output of the first pump when switching the flow path by the first switching valve, the control device switches the flow path by the first switching valve after raising the output of the first pump.

(9) The cooling system according to above (7), wherein when lowering the output of the first pump when switching the flow path by the first switching valve, the control device lowers the output of the first pump after switching the flow path by the first switching valve.

(10) The cooling system according to any one of above (6) to (9), wherein the control device switches the first switching valve based on the element temperature of the inverter.

(11) The cooling system according to any one of above (5) to (10), further comprising a second bypass flow path connected to the second flow path so as to bypass the shared flow path, and a second switching valve able to switch the flow path through which the heat medium flowing through the second heat exchanger flows, between the shared flow path and the second bypass flow path.

(12) The cooling system according to above (11), wherein the control device switches the second switching valve based on the element temperature of the battery.

Advantageous Effects of Invention

According to the present disclosure, a cooling system able to suppress an excessive rise in temperature of the inverter is provided.

DESCRIPTION OF EMBODIMENTS

Figure 1:
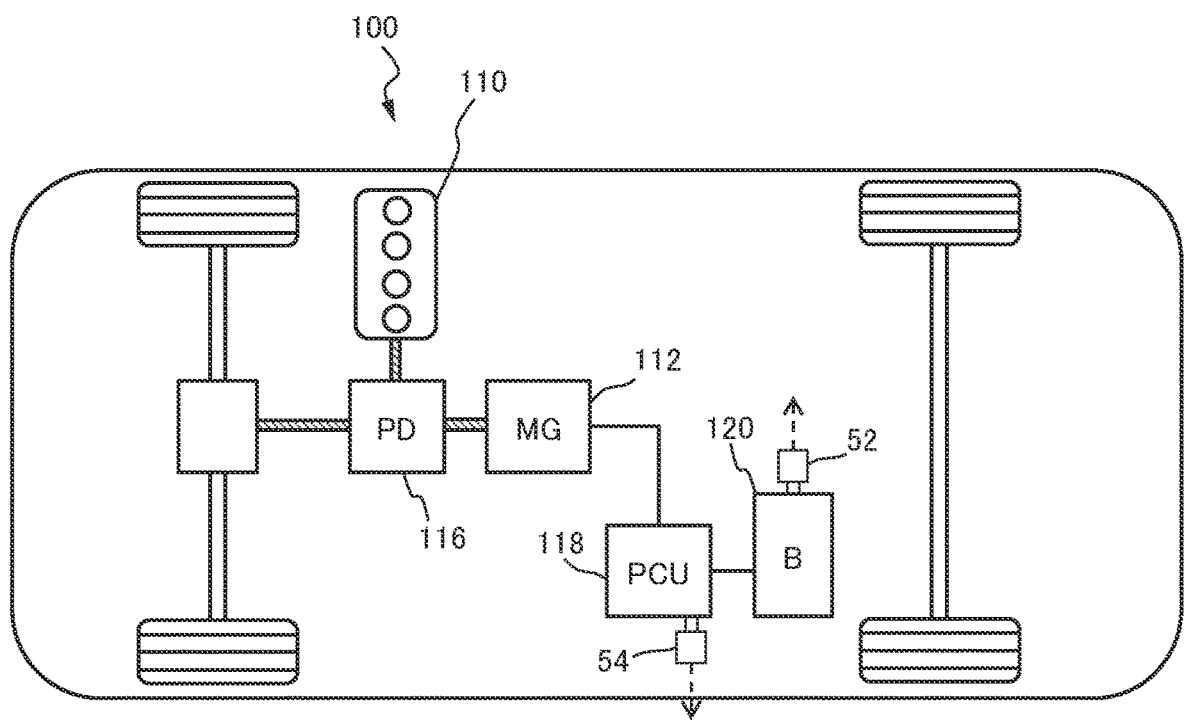
FIG. 1 is a view schematically showing the configuration of a vehicle mounting a vehicle-mounted temperature controller according to one embodiment.

Below, referring to the drawings, embodiments will be explained in detail. Note that, in the following explanation, similar components are assigned the same reference signs.

Configuration of Vehicle

FIG. 1 is a view schematically showing the configuration of a vehicle 100 mounting a vehicle-mounted temperature controller 1 according to one embodiment. As shown in FIG. 1, the vehicle 100 is provided with an internal combustion engine 110, motor-generator (MG) 112, and power division mechanism 116. In addition, the vehicle 100 is provided with a power control unit (PCU) 118 electrically connected to the MG 112 and a battery 120 electrically connected to the PCU 118. Note that, in the present embodiment, the vehicle 100 is a hybrid vehicle provided with the MG 112 and internal combustion engine 110 as sources of drive power, but may also be an electric vehicle provided with only the MG 112 as the source of drive power.

The internal combustion engine 110 is a prime mover which burns fuel inside of the engine and converts the heat energy of the combustion gas to mechanical energy. The internal combustion engine 110 is connected to the power division mechanism 116. The output of the internal combustion engine 110 is used to drive the vehicle 100 or generate electric power at the MG 112.

The MG 112 functions as a motor and generator. The MG 112 is connected to the power division mechanism 116, and is used to drive the vehicle 100 or regenerate power when braking the vehicle 100. Note that, in the present embodiment, as the motor driving the vehicle 100, the MG 112 having an electrical power generating function is used, but a motor not having an electrical power generating function may also be used.

The PCU 118 is connected between the battery 120 and the MG 112, and controls the electric power supplied to the MG 112. The PCU 118 has an inverter driving the motor, a booster converter controlling the voltage, a DCDC converter lowering the high voltage, and other heat generating components. The battery 120 is connected to the PCU 118 and MG 112, and supplies electric power for driving the vehicle 100 to the MG 112.

Configuration of Vehicle-Mounted Temperature Controller

Figure 2:
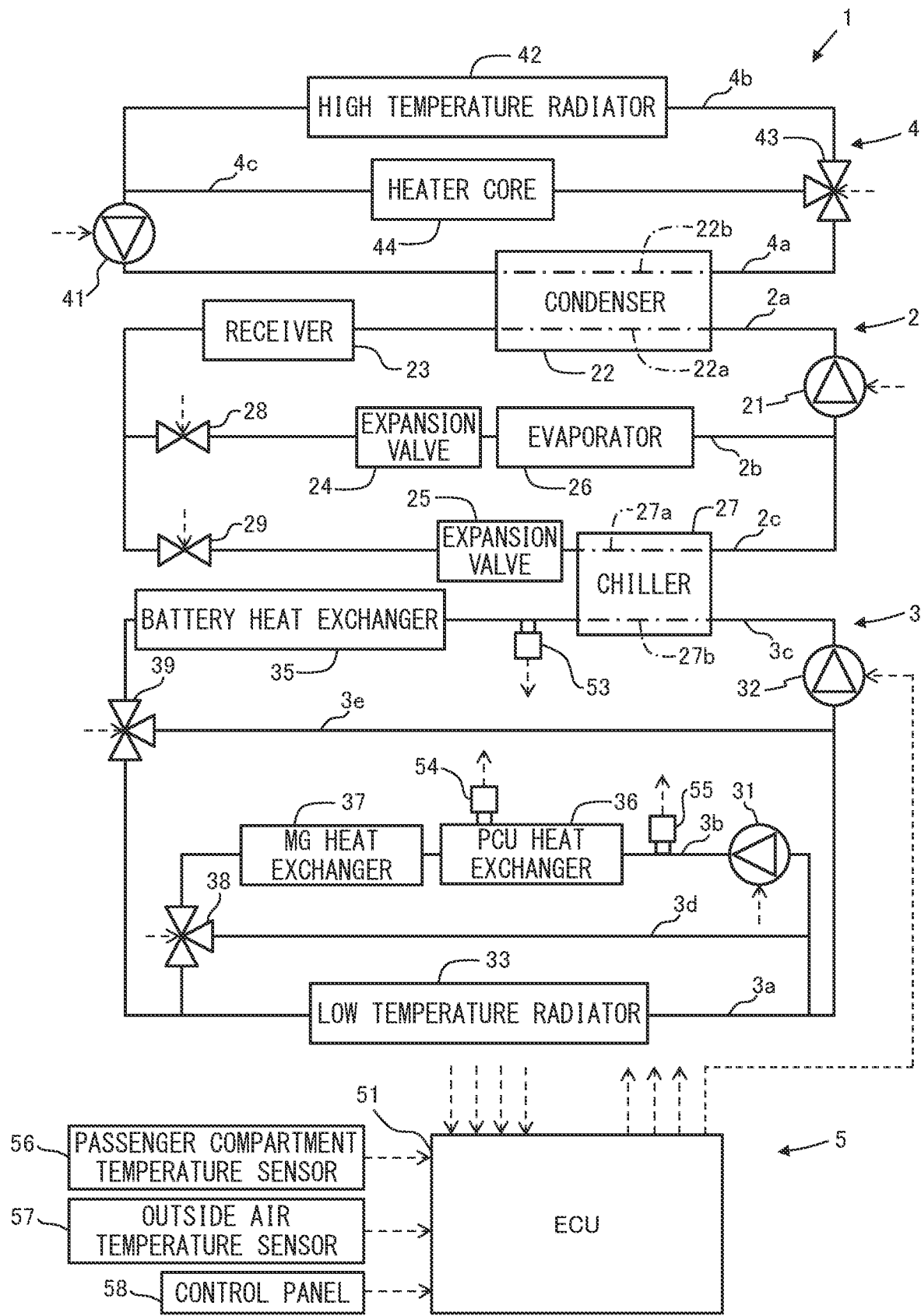
FIG. 2 is a view schematically showing the configuration of a vehicle-mounted temperature controller mounting a cooling system according to one embodiment.
Figure 3:
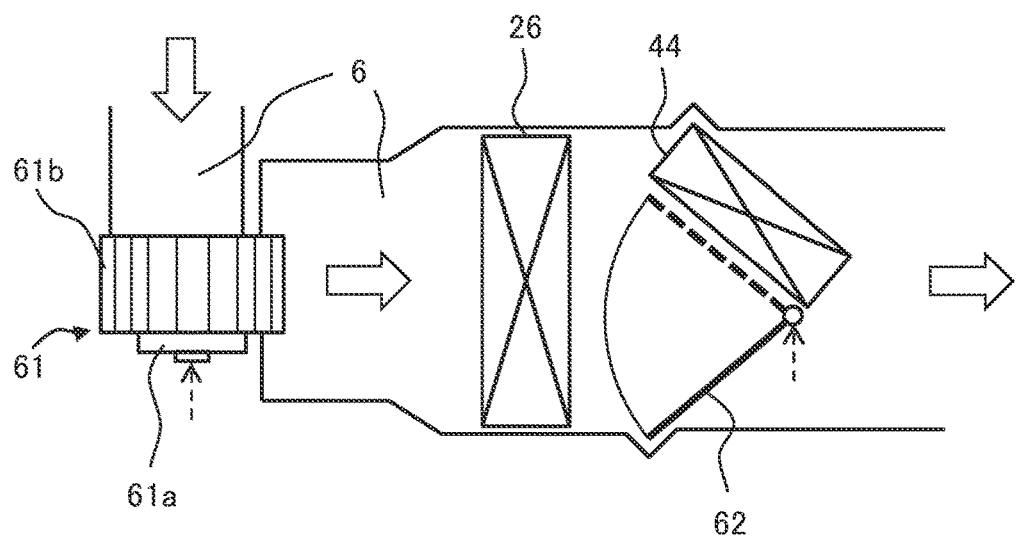
FIG. 3 is a view schematically showing the configuration of an air passage for air-conditioning of a vehicle mounting a vehicle-mounted temperature controller.
Figure 4:
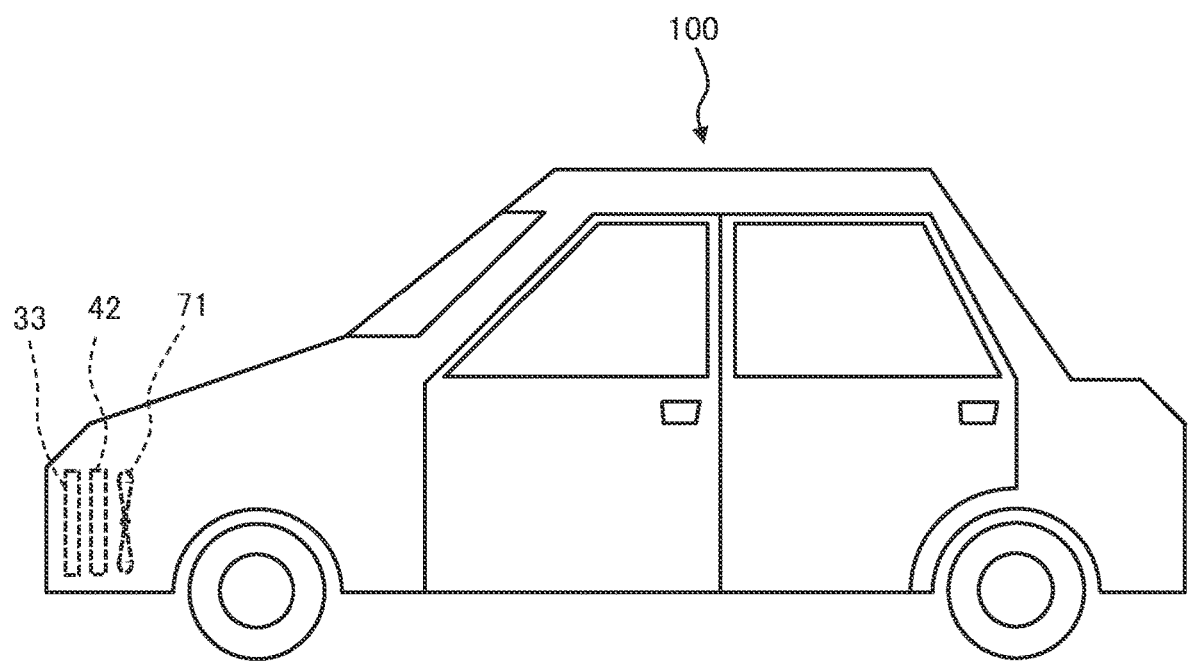
FIG. 4 is a view schematically showing a vehicle mounting a vehicle-mounted temperature controller.

Referring to FIGS. 2 to 4, the configuration of a vehicle-mounted temperature controller 1 mounting a cooling system according to one embodiment will be explained. FIG. 1 is a view of the configuration schematically showing the vehicle-mounted temperature controller 1. The vehicle-mounted temperature controller 1 includes a refrigeration circuit 2, low temperature circuit 3, high temperature circuit 4, and control device 5.

First, the refrigeration circuit 2 will be explained. The refrigeration circuit 2 includes a compressor 21, refrigerant piping 22a of a condenser 22, receiver 23, first expansion valve 24, second expansion valve 25, evaporator 26, refrigerant piping 27a of the chiller 27, first solenoid regulating valve 28, and second solenoid regulating valve 29. The refrigeration circuit 2 is configured to realize a refrigeration cycle by circulation of a refrigerant through these components when the compressor 21 is driven. For the refrigerant, for example, a hydrofluorocarbon (for example, HFC-134a) or any other substance generally used as a refrigerant in the refrigeration cycle is used.

The refrigeration circuit 2 is divided into a refrigerant basic flow path 2a, evaporator flow path 2b, and chiller flow path 2c. The evaporator flow path 2b and the chiller flow path 2c are provided parallel to each other and are respectively connected to the refrigerant basic flow path 2a.

At the refrigerant basic flow path 2a, the compressor 21, the refrigerant piping 22a of the condenser 22, and the receiver 23 are provided in that order in a direction of circulation of the refrigerant. At the evaporator flow path 2b, the first solenoid regulating valve 28, the first expansion valve 24, and the evaporator 26 are provided in that order in a direction of circulation of the refrigerant. In addition, at the chiller flow path 2c, the second solenoid regulating valve 29, the second expansion valve 25, and the refrigerant piping 27a of the chiller 27 are provided in that order.

The compressor 21 is functions as a compressor compressing the refrigerant to raise it in temperature. In the present embodiment, the compressor 21 is an electrically driven type, and is configured so that the discharge capacity can be changed steplessly by adjustment of the electric power or duty ratio of the electric power supplied to the compressor 21. In the compressor 21, the mainly gaseous refrigerant with low temperature and low pressure is adiabatically compressed, whereby it is changed to a mainly gaseous refrigerant with high temperature and high pressure.

The condenser 22 is provided with the refrigerant piping 22a and cooling water piping 22b. The condenser 22 functions as a heat exchanger for discharging heat from the refrigerant to the cooling water of the high temperature circuit 4 to cause the refrigerant to condense. Further, the refrigerant piping 22a of the condenser 22 functions as a condenser condensing the refrigerant in the refrigeration cycle. Further, in the refrigerant piping 22a of the condenser 22, the mainly gaseous refrigerant with high temperature and high pressure, flowing out from the compressor 21, is changed to mainly liquid refrigerant with high temperature and high pressure by being isobarically cooled.

The receiver 23 stores the refrigerant condensed by the refrigerant piping 22a of the condenser 22. The first expansion valve 24 and the second expansion valve 25 functions as an expander for making the refrigerant expand. These expansion valves 24 and 25 are, for example, provided with small diameter passages, and spray refrigerant from the small diameter passages to make the pressure of the refrigerant rapidly decrease. At these expansion valves 24 and 25, the liquid refrigerant with high temperature and high pressure, flowing out from the receiver 23, is depressurized and partially vaporizes, whereby it is changed to a mist-like refrigerant with low temperature and low pressure.

The evaporator 26 functions as a heat exchanger for absorbing heat from the ambient air to the refrigerant to evaporate the refrigerant. Specifically, the evaporator 26 makes the refrigerant absorb heat from the air surrounding the evaporator 26 to make the refrigerant evaporate. Therefore, in the evaporator 26, the mist-like refrigerant with low temperature and low pressure, flowing out from the first expansion valve 24 is changed to a gaseous refrigerant with low temperature and low pressure, by evaporation. As a result, the air surrounding the evaporator 26 can be cooled and the passenger compartment can be cooled.

The chiller 27 is provided with the refrigerant piping 27a and the cooling water piping 27b. The chiller 27 functions as a third heat exchanger for making the refrigerant absorb heat from the cooling water of the later explained low temperature circuit 3 to evaporate the refrigerant and cool the cooling water. Further, the refrigerant piping 27a of the chiller 27 functions as an evaporator for making the refrigerant evaporate. At the refrigerant piping 27a of the chiller 27, the mist-like refrigerant with low temperature and low pressure, flowing out from the second expansion valve 25, evaporates, whereby it is changed to a gaseous refrigerant with low temperature and low pressure. As a result, the cooling water of the low temperature circuit 3 is cooled.

The first solenoid regulating valve 28 and the second solenoid regulating valve 29 are used for changing the circulation mode of refrigerant in the refrigeration circuit 2.

The larger the opening degree of the first solenoid regulating valve 28, the greater the amount of the refrigerant flowing into the evaporator flow path 2b. Accordingly, the amount of refrigerant flowing into the evaporator 26 becomes greater. Further, the larger the opening degree of the second solenoid regulating valve 29, the greater the amount of refrigerant flowing into the chiller flow path 2c and accordingly the greater the amount of refrigerant flowing into the chiller 27. Note that, if possible to adjust the flow rate from the refrigerant basic flow path 2a to the evaporator flow path 2b and the chiller flow path 2c, some sort of valve may also be provided as a circulation mode control device, instead of these solenoid regulating valves 28 and 29.

Next, the low temperature circuit 3 will be explained. The low temperature circuit 3 functions as a cooling system for cooling heat generating equipment, such as the battery 120, PCU 118 or MG 112. The low temperature circuit 3 includes a first pump 31, a second pump 32, a cooling water piping 27b of the chiller 27, and a low temperature radiator 32. In addition, the low temperature circuit 3 includes the battery heat exchanger 35, PCU heat exchanger 36, and MG heat exchanger 37. Further, the low temperature circuit 3 includes a first three-way valve 38 and second three-way valve 39. In the low temperature circuit 3, the cooling water circulates through these components Note that, the cooling water is one example of the first heat medium. Inside the low temperature circuit 3, any other heat medium may be used instead of the cooling water.

The low temperature circuit 3 is divided into a low temperature radiator flow path 3a, PCU flow path 3b, battery flow path 3c, PCU bypass flow path 3d, and battery bypass flow path 3e. The PCU flow path 3b and the battery flow path 3c are respectively connected to the low temperature radiator flow path 3a parallel to each other. Therefore, the low temperature radiator flow path 3a functions as flow path connected to the PCU flow path 3b and battery flow path 3c in parallel to each other. Further, the low temperature radiator flow path 3a is provided with a low temperature radiator 33.

The PCU flow path 3b is provided with the first pump 31, PCU heat exchanger 36, and MG heat exchanger 37 in this order in the direction of circulation of the cooling water. Therefore, the PCU flow path 3b functions as a first flow path having the first pump 31 and PCU heat exchanger 36.

The battery flow path 3c is provided with the second pump 32, cooling water piping 27b of the chiller 27, and battery heat exchanger 35 in this order in the direction of circulation of the cooling water. Therefore, the battery flow path 3c functions as a second flow path having the second pump 32 and battery heat exchanger 35. Note that, the PCU flow path 3b and battery flow path 3c may also be provided with heat exchangers exchanging heat with heat generating equipment other than the PCU 118, MG 112, and battery 120.

The PCU bypass flow path 3d is connected to the PCU flow path 3b so as to bypass the low temperature radiator flow path 3a. Specifically, one end of the PCU bypass flow path 3d is connected with the PCU flow path 3b between the first pump 31 and the low temperature radiator 33, while the other end is connected to the PCU flow path 3b between the MG heat exchanger 37 and low temperature radiator 33. The first three-way valve 38 is provided between the PCU bypass flow path 3d and the PCU flow path 3b.

The battery bypass flow path 3e is connected to the battery flow path 3c so as to bypass the low temperature radiator flow path 3a. Specifically, one end of the battery bypass flow path 3e is connected to the battery flow path 3c between the second pump 32 and the low temperature radiator 33, while the other end is connected to the battery flow path 3c between the battery heat exchanger 35 and the low temperature radiator 33. The second three-way valve 39 is provided between the battery bypass flow path 3e and the battery flow path 3c.

The first pump 31 and second pump 32 pump the cooling water circulating through the low temperature circuit 3. In the present embodiment, the first pump 31 and second pump 32 are electrically driven water pumps. They are configured so that their discharge capacities are changed steplessly by the electric power supplied to the first pump 31 and second pump 32 or duty ratio being adjusted.

The low temperature radiator 33 is a heat exchanger exchanging heat between the cooling water circulating through the low temperature circuit 3 and the air outside of the vehicle 100 (outside air). The low temperature radiator 33 is configured to discharge heat from the cooling water to the outside air when the temperature of the cooling water is higher than the temperature of the outside air, and to make the cooling water absorb heat from the outside air when the temperature of the cooling water is lower than the temperature of the outside air.

The battery heat exchanger 35 functions as a second heat exchanger for heat generating equipment exchanging heat between the heat generating equipment of the battery 120 of the vehicle 100 and the cooling water. Specifically, the battery heat exchanger 35 is, for example, provided with piping provided around the battery 120, and is configured so that heat is exchanged between the cooling water flowing through this piping and the battery 120.

Further, the PCU heat exchanger 36 functions as a first heat exchanger for heat generating equipment exchanging heat between the heat generating equipment of the PCU 118 of the vehicle 100 and the cooling water. Specifically, the PCU heat exchanger 36 is provided with piping provided around the PCU 118 and is configured so that heat is exchanged between the cooling water flowing through this piping and the PCU 118. Note that, the PCU heat exchanger 36 is configured to exchange heat with some of the parts among the parts forming the PCU 118 (inverter, booster converter, DCDC converter, etc.). In this case as well, the PCU heat exchanger 36 is configured to exchange heat with at least the inverter.

The MG heat exchanger 37 functions as a third heat exchanger for heat generating equipment exchanging heat between the heat generating equipment of the MG (or motor) 112 of the vehicle 100 and the cooling water. Specifically, the MG heat exchanger 37 is configured to exchange heat between the oil flowing around the MG 112 and the cooling water.

The first three-way valve 38 functions as a switching valve selectively switching the flow path through which the cooling water flowing through the PCU flow path 3b, that is, the cooling water flowing through the PCU heat exchanger 36, flows, between the low temperature radiator flow path 3a and the PCU bypass flow path 3d. When the first three-way valve 38 is set to the low temperature radiator flow path 3a side, if the first pump 31 is operated, cooling water circulates through the low temperature radiator 33, PCU heat exchanger 36, and MG heat exchanger 37. On the other hand, when the first three-way valve 38 is set to the PCU bypass flow path 3d side, if the first pump 31 is operated, the cooling water circulates through the PCU heat exchanger 36 and MG heat exchanger 37 without passing through the low temperature radiator 33.

The second three-way valve 39 functions as a switching valve selectively switching the flow path through which the cooling water flowing through the battery flow path 3c, that is, the cooling water flowing through the battery heat exchanger 35, flows, between the low temperature radiator flow path 3a and the battery bypass flow path 3e. When the second three-way valve 39 is set to the low temperature radiator flow path 3a side, if the second pump 32 is operated, the cooling water circulates through the low temperature radiator 33, the cooling water piping 27b of the chiller 27, and the battery heat exchanger 35. On the other hand, when the second three-way valve 39 is set to the battery bypass flow path 3e side, if the second pump 32 is operated, the cooling water circulates through the cooling water piping 27b of the chiller 27 and battery heat exchanger 35 without passing through the low temperature radiator 33.

Note that, if possible to selectively switch the flow path between the low temperature radiator flow path 3a and the PCU bypass flow path 3d or adjust the flow rate by which the cooling water flows between these, instead of the first three-way valve 38, an adjustment valve or shutoff valve or other adjusting device may also be used. Similarly, if possible to selectively switch the flow path between the low temperature radiator flow path 3a and the battery bypass flow path 3e or adjust the flow rate by which the cooling water flows between these, instead of the second three-way valve 39, an adjustment valve or shutoff valve or other adjusting device may be used.

Next, the high temperature circuit 4 will be explained. The high temperature circuit 4 includes a third pump 41, the cooling water piping 22b of the condenser 22, a high temperature radiator 42, a third three-way valve 43, and a heater core 44. In the high temperature circuit 4 as well, the cooling water circulates through these components. Note that, this cooling water is one example of the second heat medium. Inside the high temperature circuit 4, any other heat medium may be used instead of the cooling water.

Further, the high temperature circuit 4 is divided into a high temperature basic flow path 4a, high temperature radiator flow path 4b, and heater flow path 4c. The high temperature radiator flow path 4b and the heater flow path 4c are respectively connected to the high temperature basic flow path 4a, parallel with respect to the high temperature basic flow path 4a.

At the high temperature basic flow path 4a, a third pump 41 and the cooling water piping 22b of the condenser 22 are provided in that order in the direction of circulation of the cooling water. At the high temperature radiator flow path 4b, a high temperature radiator 42 is provided. Further, at the heater flow path 4c, the heater core 44 is provided. A third three-way valve 43 is provided between the high temperature basic flow path 4a, and high temperature radiator flow path 4b and the heater flow path 4c.

The third pump 41 pumps the cooling water circulated through the high temperature circuit 4. In the present embodiment, the third pump 41 is an electric type water pump similar to the first pump 31 and second pump 32. Further, the high temperature radiator 42, in the same way as the low temperature radiator 33, is a heat exchanger exchanging heat between the cooling water circulating through the high temperature circuit 4 and the outside air.

The third three-way valve 43 functions as a circulation mode control device for controlling the circulation mode of the cooling water flowing out from the cooling water piping 22b of the condenser 22, and is configured to selectively change paths, to which the cooling water flows into, between the high temperature radiator flow path 4b and the heater flow path 4c. If the third three-way valve 43 is set at the high temperature radiator flow path 4b side, the cooling water flowing out from the cooling water piping 22b of the condenser 22 flows through the high temperature radiator flow path 4b. On the other hand, if the third three-way valve 43 is set at the heater flow path 4c side, the cooling water flowing out from the cooling water piping 22b of the condenser 22 flows through the heater core 44. Note that, if possible to suitably adjust the flow rate of cooling water flowing into the high temperature radiator flow path 4b and heater flow path 4c, an adjusting valve or on-off valve or other circulation mode control device may be used instead of the third three-way valve 43.

The heater core 44 is configured to exchange heat between the cooling water circulating through the high temperature circuit 4 and the air surrounding the heater core 44 to thereby heat the passenger compartment. Specifically, the heater core 44 is configured so as to discharge heat from the cooling water to the air surrounding the heater core 44. Therefore, if high temperature cooling water flows to the heater core 44, the temperature of the cooling water is decreased and the air surrounding the heater core 44 is warmed.

FIG. 3 is a view of the configuration schematically showing the air passage 6 for air-conditioning the vehicle 100 mounting the vehicle-mounted temperature controller 1. In the air passage 6, air flows in the direction shown by the arrow marks in the figure. The air passage 6 shown in FIG. 3 is connected to the outside of the vehicle 100 or the air intake openings of the passenger compartment. The outside air or the air inside the passenger compartment flows into the air passage 6, according to the state of control by the control device 5. Further, the air passage 6 shown in FIG. 3 is connected to air vent openings blowing air into the passenger compartment. Air is supplied from the air passage 6 to any of the air vent openings according to the state of control by the control device 5.

As shown in FIG. 3, at the air passage 6 for air-conditioning of the present embodiment, a blower 61, evaporator 26, air mix door 62, and heater core 44 are provided in that order in the direction of flow of the air.

The blower 61 is provided with a blower motor 61a and a blower fan 61b. The blower 61 is configured so that if the blower fan 61b is driven by the blower motor 61a, the outside air or the air inside the passenger compartment flows into the air passage 6 and the air flows through the air passage 6.

The air mix door 62 adjusts the flow rate of the air flowing through the heater core 44 in the air flowing through the air passage 6. The air mix door 62 is configured to be able to be adjusted among the state where all of the air flowing through the air passage 6 flows through the heater core 44, the state where none of the air flowing through the air passage 6 flows through the heater core 44, and states between them.

In the thus configured air passage 6, when the blower 61 is driven, if the refrigerant flows through the evaporator 26, the air flowing through the air passage 6 is cooled. Therefore, the passenger compartment is cooled. Further, when the blower 61 is driven, if the cooling water flows through the heater core 44 and the air mix door 62 is controlled so that air flows through the heater core 44, the air flowing through the air passage 6 is warmed. Therefore, the passenger compartment is warmed.

FIG. 4 is a view schematically showing the vehicle 100 mounting the vehicle-mounted temperature controller 1. As shown in FIG. 4, at the inside of the front grille of the vehicle 100, a low temperature radiator 33 and high temperature radiator 42 are arranged. Therefore, when the vehicle 100 is running, wind generated based on movement of vehicle strikes these radiators 33 and 42. Further, a fan 71 is provided adjacent to these radiators 33 and 42. The fan 71 is configured so that if driven, the air strikes the radiators 33 and 42. Therefore, even when the vehicle 100 is not running, by driving the fan 71, it is possible to make air strike the radiators 33. Although in the example shown in FIG. 4, the high temperature radiator 42 is disposed behind the low temperature radiator 33, the low temperature radiator 33 may be disposed behind the high temperature radiator 42.

Referring to FIG. 2, the control device 5 is provided with an electronic control unit (ECU) 51. The ECU 51 is provided with a processor for performing various types of processing, a memory storing programs and various types of information, and an interface connected with various actuators and various sensors.

Further, the control device 5 is provided with a battery temperature sensor 52 detecting the temperature of elements (cells) of the battery 120 (FIG. 1), a battery water temperature sensor 53 detecting the temperature of cooling water flowing into the battery heat exchanger 35. Further, the control device 5 is provided with a PCU temperature sensor 54 detecting the temperature of elements (for example, temperature of element such as the inverter) of the PCU 118 (FIG. 1), and a PCU water temperature sensor 55 detecting the temperature of cooling water flowing into the PCU heat exchanger 36. In addition, the control device 5 is provided with an internal temperature sensor 56 detecting the temperature of the inside of the vehicle 100, an external temperature sensor 57 detecting the temperature of the outside of the vehicle 100, and a control panel 58 which is controlled by a user. The ECU 51 is connected to these sensors and control panel 58, and output signals from these sensors and the control panel 58 are input to the ECU 51.

In addition, the ECU 51 is connected to various types of actuators of the vehicle-mounted temperature controller 1 and controls these actuators. Specifically, the ECU 51 is connected to the compressor 21, the solenoid regulating valves 28 and 29, the pumps 31, 32 and 41, the three-way valves 38, 39, and 43, the blower motor 61a, the air mix door 62, and the fan 71 and controls the same.

Note that, the configuration of the vehicle-mounted temperature controller 1 shown in FIGS. 2 to 4 is one example. The vehicle-mounted temperature controller may be configured differently as well. Specifically, for example, the chiller 27 may also be configured so as to discharge heat into the atmosphere from the refrigerant without connection with the low temperature circuit 3. Further, the low temperature circuit (cooling system) 3 may not be provided with the chiller, and may be configured independently from the refrigeration circuit or high temperature circuit.

Operation of Vehicle-Mounted Temperature Controller

Figure 5:
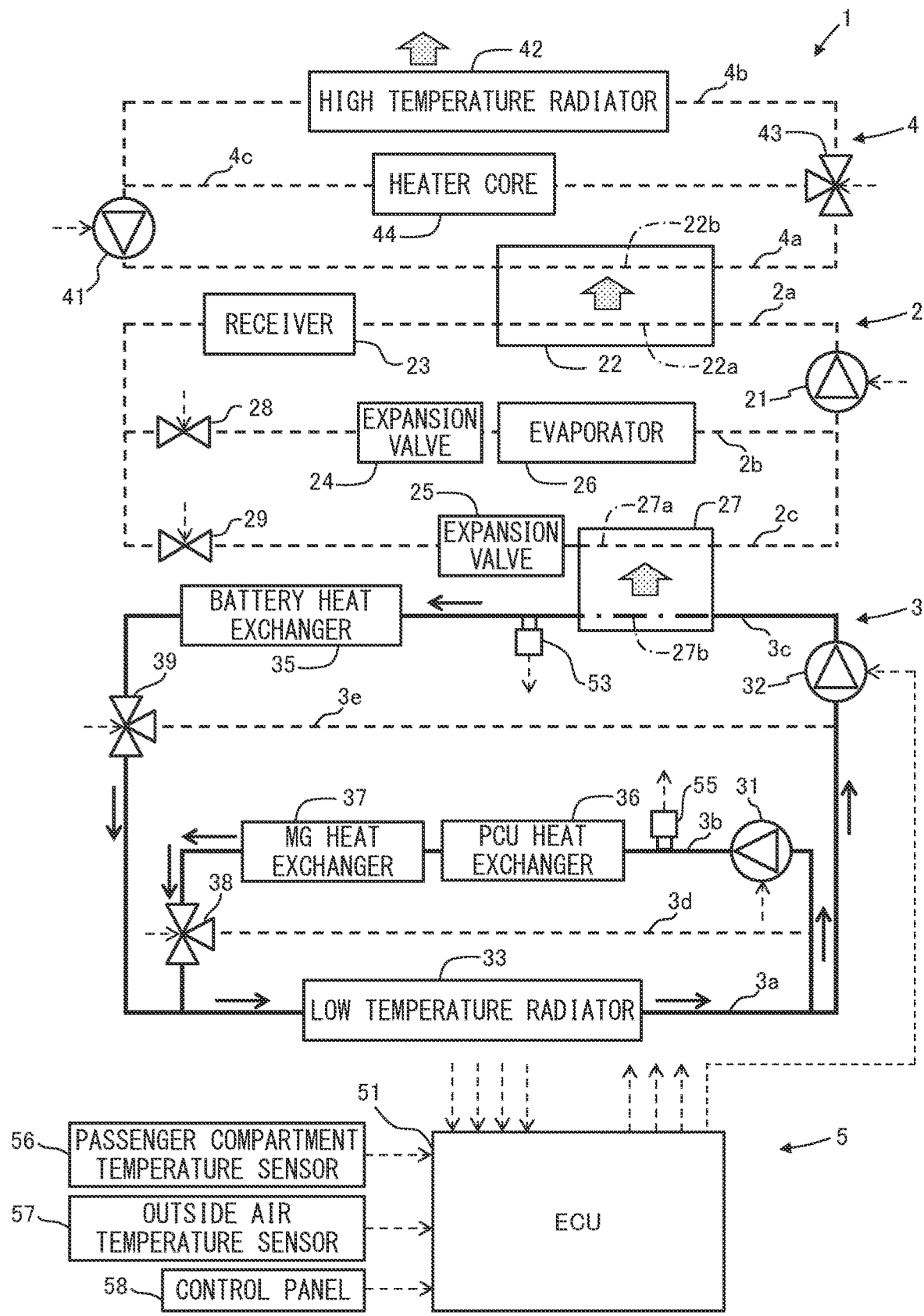
FIG. 5 shows an example of a state of operation of a vehicle-mounted temperature controller in the case where neither cooling nor heating of a passenger compartment is demanded (stopping mode).
Figure 6:
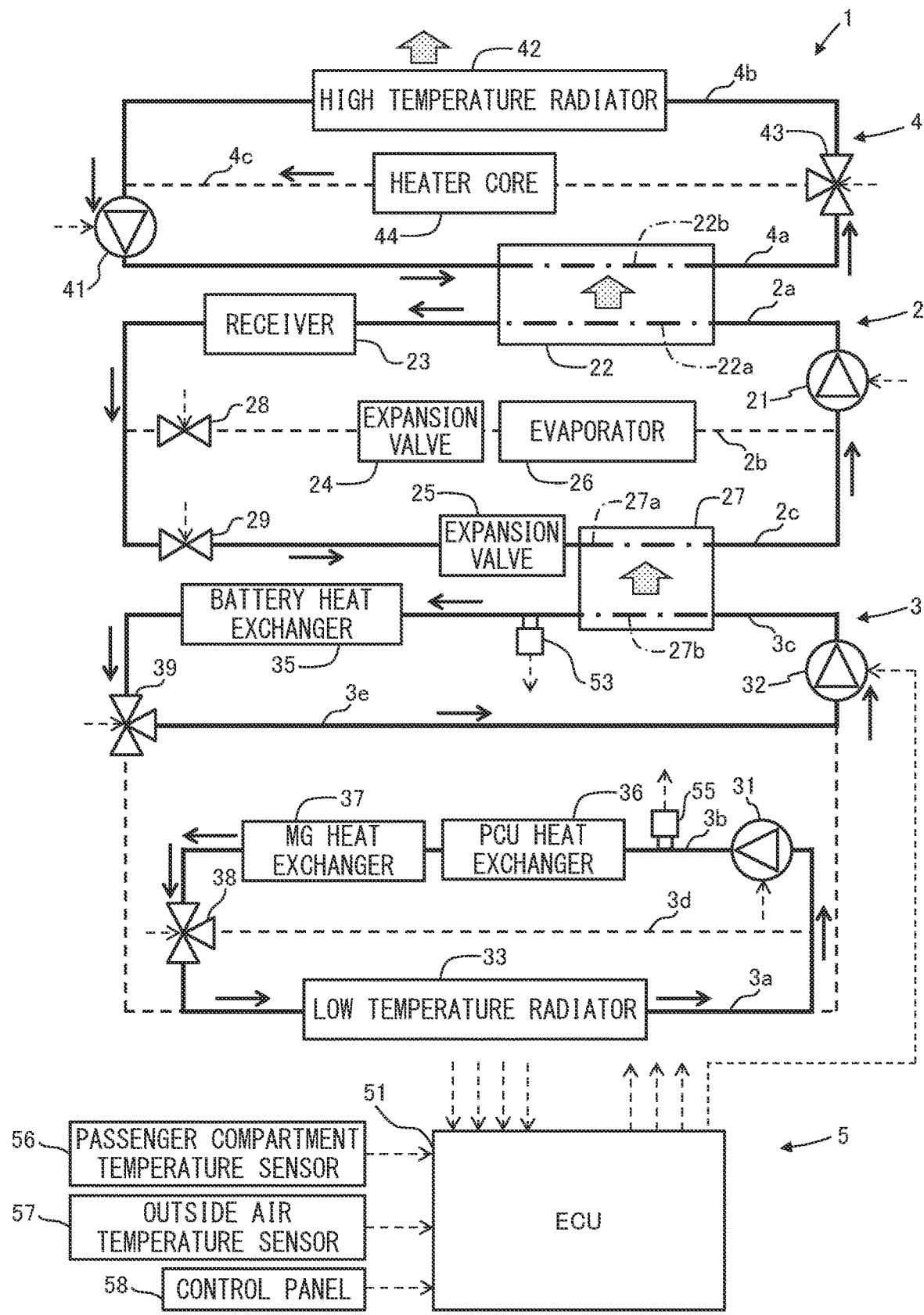
FIG. 6 shows an example of a state of operation of a vehicle-mounted temperature controller in the case where neither cooling nor heating of the passenger compartment is demanded (stopping mode).

The control device 5 sets the operating mode of the vehicle-mounted temperature controller 1, based on the output signals of the battery temperature sensor 52, PCU temperature sensor 54, internal temperature sensor 56, external temperature sensor 57, and control panel 58. Below, referring to FIGS. 4 to 6, typical operating modes of the vehicle-mounted temperature controller 1 will be explained. In FIGS. 4 to 6, the flow paths through which the refrigerant or the cooling water flows are shown by the solid lines, while the flow paths through which the refrigerant or the cooling water does not flow are shown by the broken lines. Further, the fine arrows in the figure show the flow directions of the refrigerant or the cooling water, while the thick arrows show the transfer directions of heat.

FIG. 5 shows an example of the operating state of the vehicle-mounted temperature controller 1 in the case where neither cooling nor heating of the passenger compartment is demanded (stopping mode). In the stopping mode, the PCU 118 or battery 120 is cooled without either of cooling or heating of the passenger compartment being performed.

As shown in FIG. 5, in the stopping mode, the compressor 21 and the third pump 41 are stopped. Therefore, refrigerant does not circulate through the refrigeration circuit 2 and accordingly heat is not exchanged at the chiller 27. On the other hand, even in the stopping mode, the first pump 31 and second pump 32 are operated. As a result, in the stopping mode, in the battery heat exchanger 35, PCU heat exchanger 36, or MG heat exchanger 37, heat of the battery 120, MG 112, or PCU 118 is transferred to the cooling water.

FIG. 6 shows an example of the operating state of the vehicle-mounted temperature controller 1 in the case where neither cooling nor heating of the passenger compartment is demanded (stopping mode). However, in the stopping mode shown in FIG. 6, refrigerant circulates in the refrigeration circuit 2 so as to cool the cooling water of the low temperature circuit 3.

In the stopping mode shown in FIG. 6, all of the compressor 21, first pump 31, second pump 32, and third pump 41 are operated. Further, in the stopping mode shown in FIG. 6, the first electromagnetic adjustment valve 28 is closed, the second electromagnetic adjustment valve 29 is opened, and the third three-way valve 43 is set to the high temperature radiator flow path 4b side.

As a result, in the stopping mode shown in FIG. 6, at the chiller 27, the heat of the cooling water of the low temperature circuit 3 is transferred to the refrigerant whereby the cooling water is cooled. Further, at the condenser 22 of the refrigeration circuit 2, the heat of the refrigerant is transferred to the cooling water of the high temperature circuit 4 whereby the cooling water of the high temperature circuit 4 is warmed. After that, this high temperature cooling water is cooled by heat exchanged at the high temperature radiator 42 with the outside air, and again flows into the condenser 22. Therefore, in the stopping mode shown in FIG. 6, at the chiller 27, heat is absorbed from the cooling water of the low temperature circuit 3, and that heat is discharged at the high temperature radiator 42.

Figure 7:
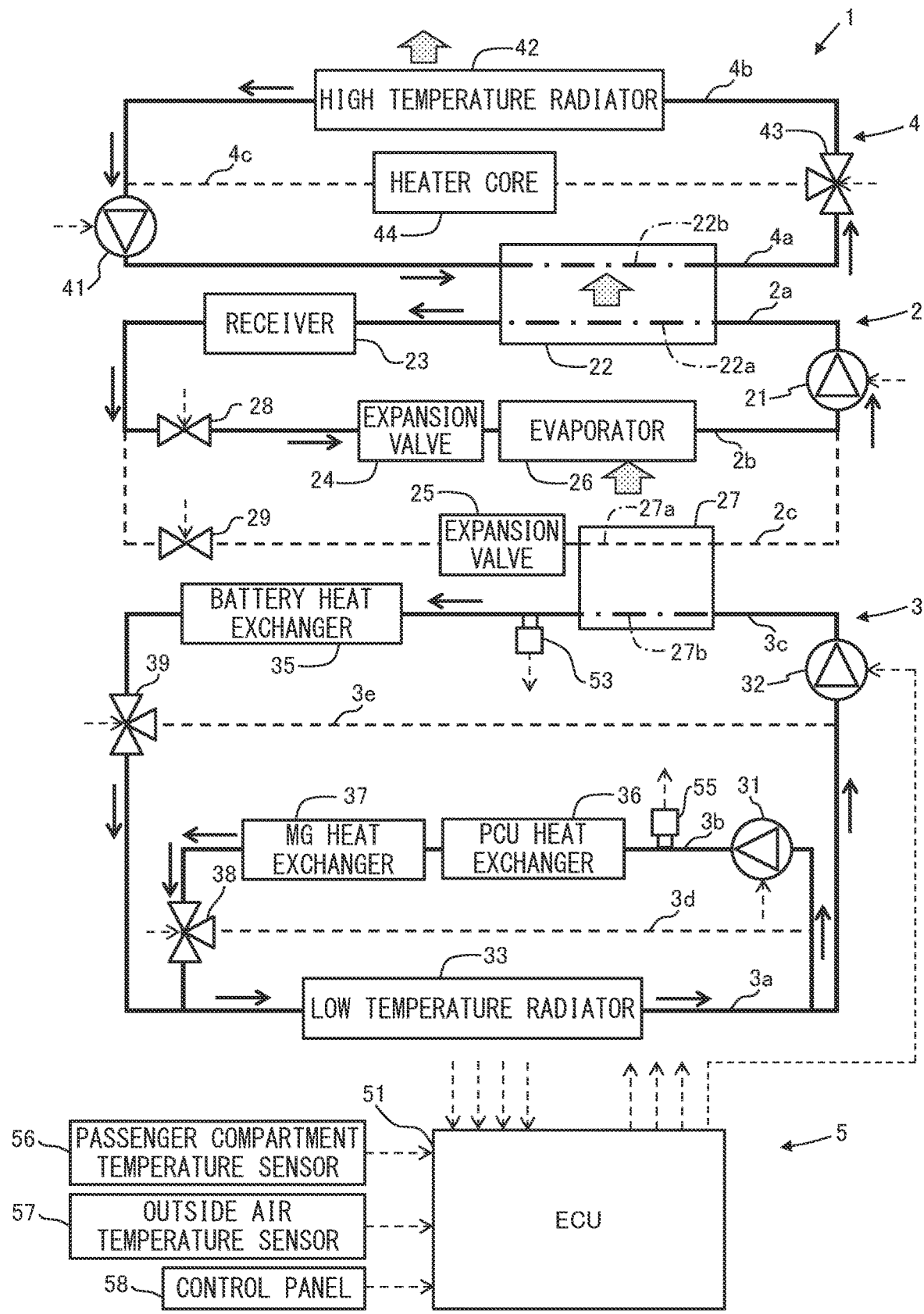
FIG. 7 shows an example of a state of operation of a vehicle-mounted temperature controller in the case where cooling of the passenger compartment is demanded (cooling mode).

FIG. 7 shows an example of the operating state of the vehicle-mounted temperature controller 1 in the case where cooling of the passenger compartment is demanded (cooling mode). In the cooling mode, the air around the evaporator to be cooled by the evaporator is cooled.

As shown in FIG. 7, in the cooling mode, all of the compressor 21, first pump 31, second pump 32, and third pump 41 are operated. Further, in the cooling mode, the first electromagnetic adjustment valve 28 is opened, the second electromagnetic adjustment valve 29 is closed, and the third three-way valve 43 is set to the high temperature radiator flow path 4b side.

As a result, in the cooling mode, at the evaporator 26, the heat of the surrounding air is transferred to the refrigerant whereby the surrounding air is cooled. Due to this, the passenger compartment is cooled. On the other hand, at the condenser 22, the heat of the refrigerant is transferred to the cooling water of the high temperature circuit 4 whereby the cooling water of the high temperature circuit 4 is warmed. After that, this high temperature cooling water exchanges heat with the outside air at the high temperature radiator 42 to be cooled, and again flows into the condenser 22. Therefore, in the cooling mode, heat is absorbed from the surrounding air by evaporator 26, and that heat is discharged at the high temperature radiator 42. Further, in the cooling mode, in the same way as in the stopping mode shown in FIG. 5, at the battery heat exchanger 35, PCU heat exchanger 36, and MG heat exchanger 37, the heat of the battery 120, MG 112, and PCU 118 is transferred to the cooling water.

Figure 8:
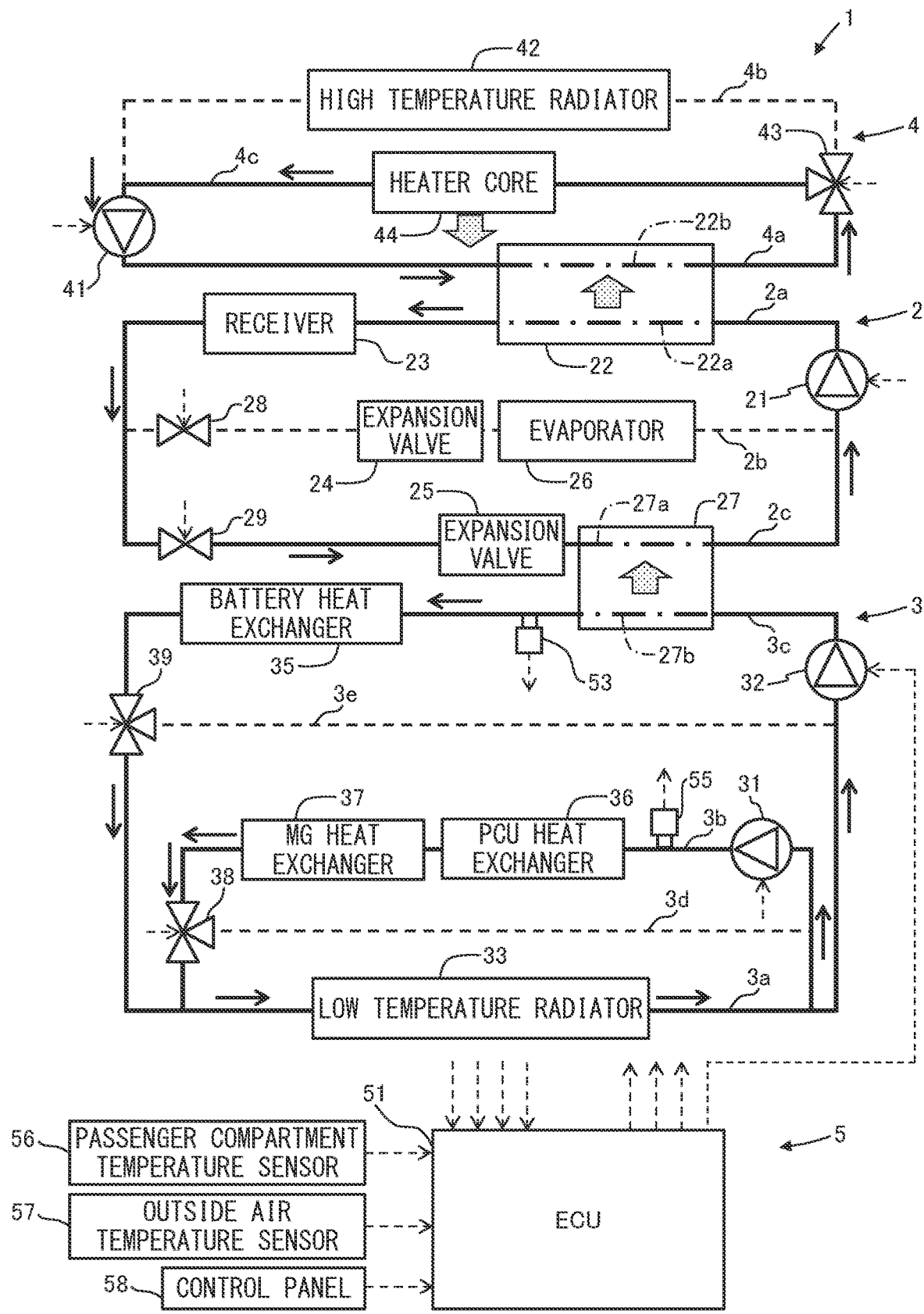
FIG. 8 shows an example of a state of operation of a vehicle-mounted temperature controller in the case where heating of the passenger compartment is demanded (heating mode).

FIG. 8 shows an example of the operating state of the vehicle-mounted temperature controller 1 in the case where heating of the passenger compartment is demanded (heating mode). In the heating mode, the air to be heated around the heater core 44 is heated by the heater core 44.

As shown in FIG. 8, in the heating mode, all of the compressor 21, first pump 31, second pump 32 and third pump 41 are operated. Further, in the heating mode, the first electromagnetic adjusting valve 28 is closed, the second electromagnetic adjusting valve 29 is opened, and the third three-way valve 43 is set to the heater flow path 4c side.

As a result, in the heating mode, the heat of the cooling water of the low temperature circuit 3 is transferred to the refrigerant at the chiller 27, whereby the cooling water is cooled. The low temperature cooling water flows through the low temperature radiator 33, whereby heat is absorbed from the outside air. Further, the low temperature cooling water flows through the battery heat exchanger 35, PCU heat exchanger 36, and MG heat exchanger 37, whereby heat is absorbed from the battery 120, MG 112, and PCU 118. Cooling water absorbing heat from the outside air or heat generating equipment discharges the heat to the refrigerant at the chiller 27.

Further, in the heating mode, the heat of the refrigerant is transferred to the cooling water of the high temperature circuit 4 at the condenser 22 of the refrigeration circuit 2, whereby the cooling water of the high temperature circuit 4 is warmed. After that, this high temperature cooling water exchanges heat with the ambient air at the heater core 44, whereby the air around the heater core 44 is warmed. Therefore, in the heating mode, heat is absorbed from the outside air at the low temperature radiator 33 and heat is absorbed from the heat generating equipment at the heat exchanger for heat generating equipment, and that heat is discharged at the heater core 44.

Flow States at Low Temperature Circuit

Figure 9:
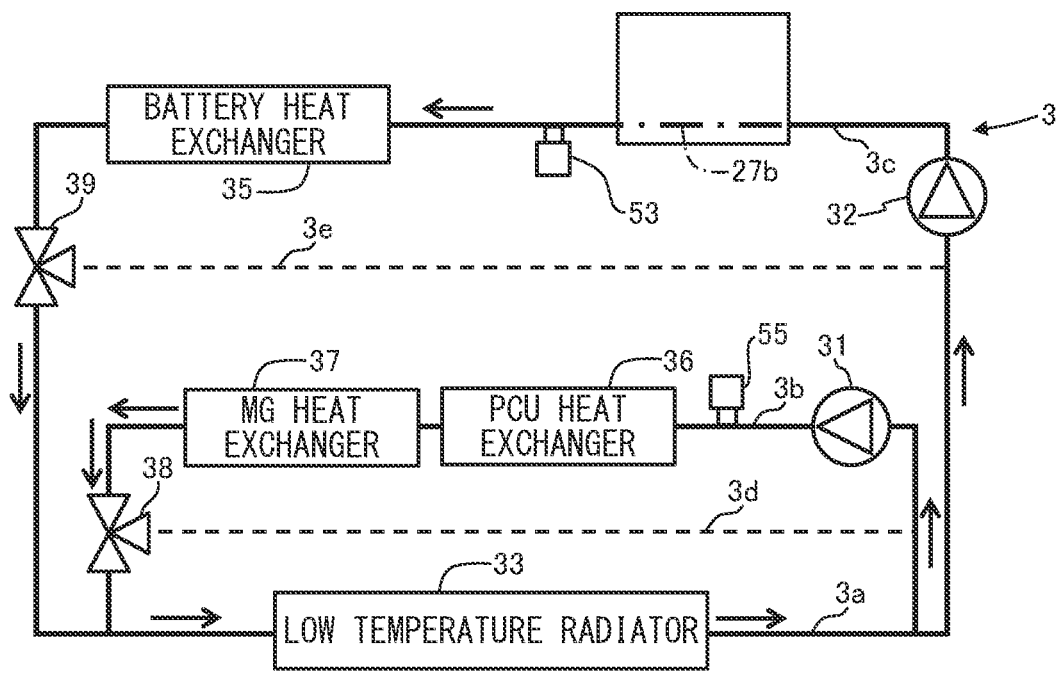
FIG. 9 shows an example of one flow state of cooling water in a low temperature circuit (flow state A).

Next, referring to FIGS. 9 to 12, the flow states of the cooling water at the low temperature circuit 3 will be explained. FIG. 9 shows one example of the flow state of the cooling water at the low temperature circuit 3 (below, referred to as the "flow state A").

As shown in FIG. 9, in the flow state A, the first three-way valve 38 is set to the low temperature radiator flow path 3a side, while the second three-way valve 39 is also set to the low temperature radiator flow path 3a side. As a result, the cooling water pumped by the first pump 31 and flowing through the PCU flow path 3b flows through the low temperature radiator flow path 3a. Similarly, the cooling water pumped by the second pump 32 and flowing through the battery flow path 3c also flows through the low temperature radiator flow path 3a.

In other words, in the flow state A, both the cooling water flowing through the PCU flow path 3b and the cooling water flowing through the battery flow path 3c flow through the low temperature radiator flow path 3a. Therefore, when the PCU 118, etc., and the battery 120 generate heat to an extent where the cooling water has to be cooled at the low temperature radiator 33, the flow state of the low temperature circuit 3 is set to the flow state A.

Figure 10:
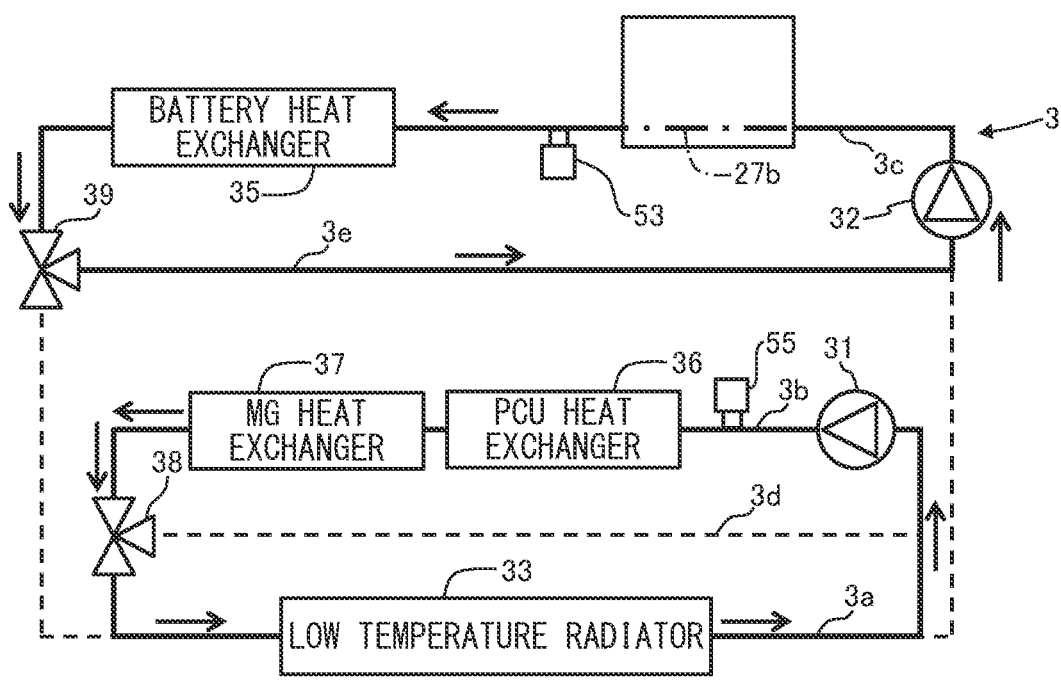
FIG. 10 shows an example of another flow state of cooling water in a low temperature circuit (flow state B).

FIG. 10 shows an example of another flow state of the cooling water at the low temperature circuit 3 (below, referred to as the "flow state B"). As shown in FIG. 10, at the flow state B, the first three-way valve 38 is set to the low temperature radiator flow path 3a side, and the second three-way valve 39 is set to the battery bypass flow path 3e side. As a result, the cooling water flowing through the PCU flow path 3b flows through the low temperature radiator flow path 3a. On the other hand, the cooling water flowing through the battery flow path 3c flows through the battery bypass flow path 3e without flowing through the low temperature radiator flow path 3a.

The flow state of the low temperature circuit 3 is set to the flow state B, when the amount of heat generation of the PCU 118, etc., is great, the amount of heat generation of the battery 120 is small, and the cooling water flowing through the battery flow path 3c does not have to be cooled by the low temperature radiator 33. Alternatively, the flow state of the low temperature circuit 3 is set to the flow state B, when the amount of heat generation of the PCU 118, etc., is great, the amount of heat generation of the battery is extremely great, and the cooling water flowing through the battery flow path 3c has to be cooled using the chiller 27.

Figure 11:
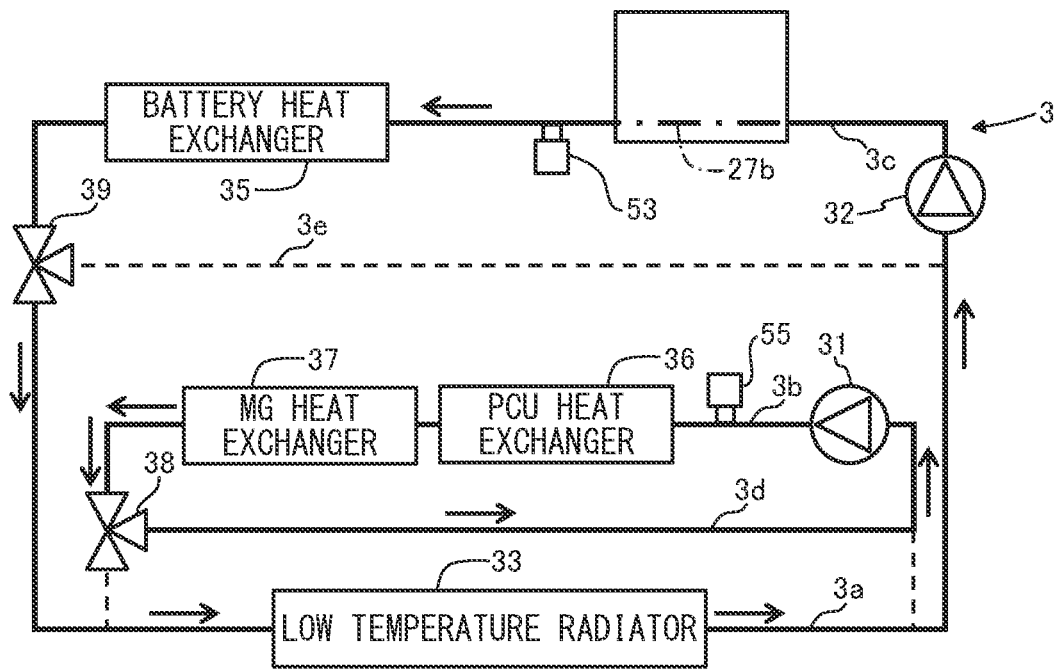
FIG. 11 shows an example of still another flow state of cooling water in a low temperature circuit (flow state C).

FIG. 11 shows an example of still another flow state of the cooling water at the low temperature circuit 3 (below, referred to as the "flow state C"). As shown in FIG. 11, at the flow state C, the first three-way valve 38 is set to the PCU bypass flow path 3d side, and the second three-way valve 39 is set to the low temperature radiator flow path 3a side. As a result, the cooling water flowing through the PCU flow path 3b flows through the PCU bypass flow path 3d without flowing through the low temperature radiator flow path 3a. On the other hand, the cooling water flowing through the battery flow path 3c flows through the low temperature radiator flow path 3a.

The flow state of the low temperature circuit 3 is set to the flow state C, when the amount of heat generation of the PCU 118, etc., is small, the cooling water flowing through the PCU flow path 3b does not have to be cooled by the low temperature radiator 33, and the amount of heat generation of the battery 120 is great.

Figure 12:
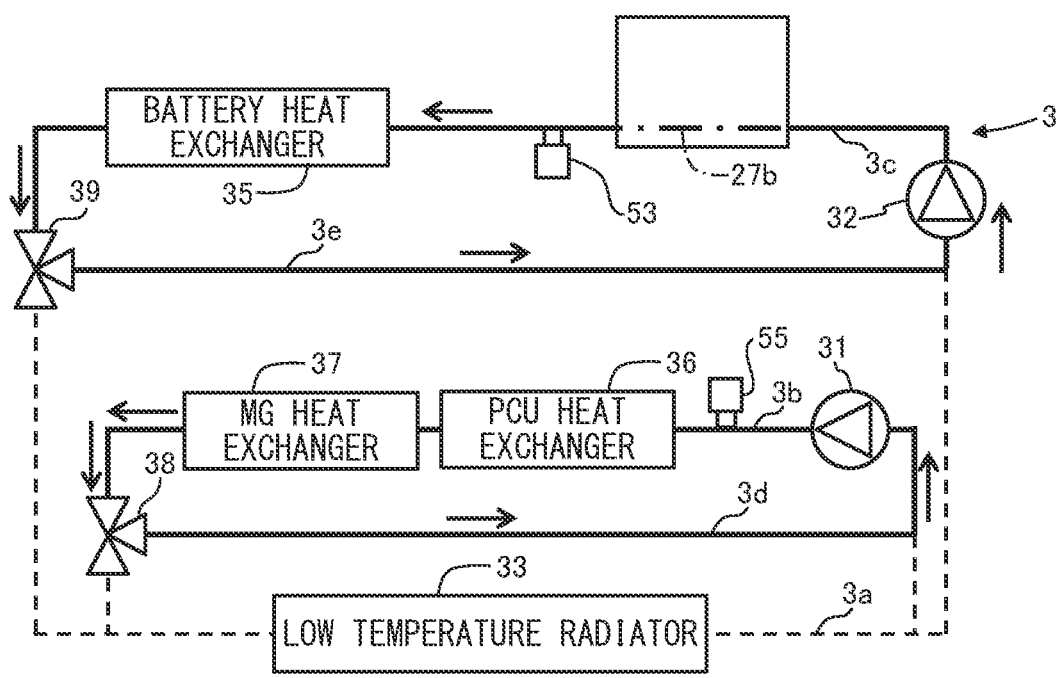
FIG. 12 shows an example of yet still another flow state of cooling water in a low temperature circuit (flow state D).

FIG. 12 shows an example of yet still another flow state of the cooling water at the low temperature circuit 3 (below, referred to as the "flow state D"). As shown in FIG. 12, at the flow state D, the first three-way valve 38 is set to the PCU bypass flow path 3d side, and the second three-way valve 39 is set to the battery bypass flow path 3e side. As a result, the cooling water flowing through the PCU flow path 3b flows through the PCU bypass flow path 3d without flowing through the low temperature radiator flow path 3a. On the other hand, the cooling water flowing through the battery flow path 3c flows through the battery bypass flow path 3e without flowing through the low temperature radiator flow path 3a.

Note that, in this Description, the state where both of the flows of cooling water flowing through the PCU flow path 3b and the battery flow path 3c flow through the low temperature radiator flow path 3a (that is, the flow state A) will also be referred to as the "first state". On the other hand, the state where at least one of the flows of cooling water flowing through the PCU flow path 3b and the battery flow path 3c does not flows through the low temperature radiator flow path 3a (that is, the flow states B, C, and D) will also be referred to as the "second state".

Control of Three-Way Valve at Low Temperature Circuit

Figure 13A:
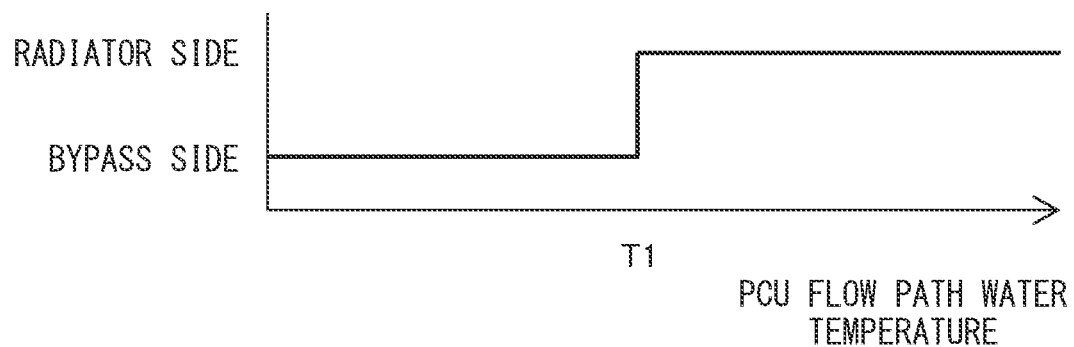
FIGS. 13A and 13B are view showing a method of setting switching positions of a first three-way valve and a second three-way valve.
Figure 13B:
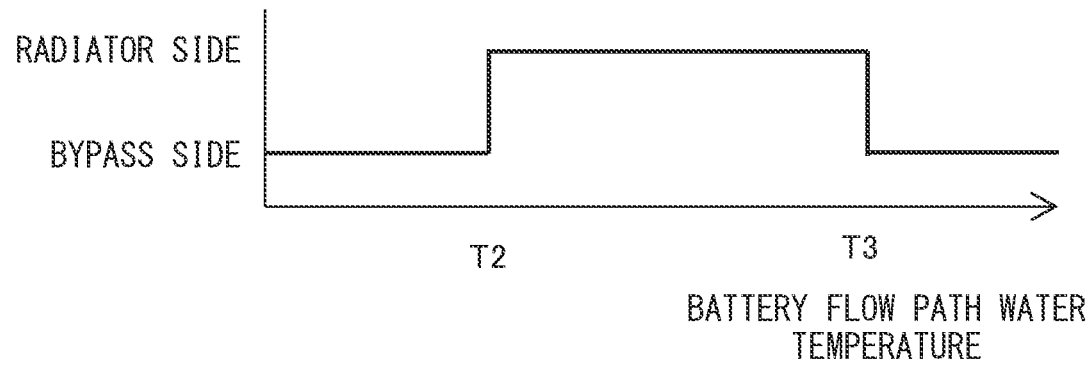

Next, referring to FIGS. 13A and 13B, the control of the three-way valves 38, 39 at the low temperature circuit 3 will be explained. FIG. 13A is a view showing the method of setting the switching position of the first three-way valve 38 provided at the PCU flow path 3b. FIG. 13B is a view showing the method of setting the switching position of the second three-way valve 39 provided at the battery flow path 3c.

In the present embodiment, the switching position of the first three-way valve 38 is set based on the temperature of the cooling water flowing through the PCU flow path 3b. Specifically, as shown in FIG. 13A, the switching position of the first three-way valve 38 is set to the PCU bypass flow path 3d side, when the temperature of the cooling water flowing through the PCU flow path 3b is less than a predetermined temperature T1. On the other hand, the switching position of the first three-way valve 38 is set to the low temperature radiator flow path 3a side, when the temperature of the cooling water flowing through the PCU flow path 3b is equal to or greater than a predetermined first temperature T1. That is, when the temperature of the cooling water flowing through the PCU flow path 3b is high, to lower that temperature, the cooling water is made to flow to the low temperature radiator 33. On the other hand, if the cooling water flows through the low temperature radiator 33, compared to the case where the cooling water flows through the PCU bypass flow path 3d, the flow path resistance is larger. Therefore, to keep down the increase in the flow path resistance, when the temperature of the cooling water flowing through the PCU flow path 3b is low, the cooling water is made to flow to the PCU bypass flow path 3d.

Note that, in the present embodiment, the switching position of the first three-way valve 38 is set based on the temperature of the cooling water flowing through the PCU flow path 3b, but the switching position of the first three-way valve 38 may also be set based on the element temperature of the PCU 118 and other parameters.

Further, in the present embodiment, the switching position of the second three-way valve 39 is set based on the temperature of the cooling water flowing through the battery flow path 3c. Specifically, as shown in FIG. 13B, the switching position of the second three-way valve 39 is set to the battery bypass flow path 3e side, when the temperature of the cooling water flowing through the battery flow path 3c is less than a predetermined second temperature T2. On the other hand, the switching position of the second three-way valve 39 is set to the low temperature radiator flow path 3a side, when the temperature of the cooling water flowing through the battery flow path 3c is equal to or greater than the predetermined temperature T2. That is, when the temperature of the cooling water flowing through the battery flow path 3c is high, to lower the temperature, the cooling water flows to the low temperature radiator 33. On the other hand, if the cooling water flows through the low temperature radiator 33, compared to when the cooling water flows through the battery bypass flow path 3e, the flow path resistance is larger. Therefore, to keep down the increase of the flow path resistance, when the temperature of the cooling water flowing through the battery flow path 3e is low, the cooling water is made to flow through the battery bypass flow path 3e.

Further, the switching position of the second three-way valve 39 is set to the battery bypass flow path 3e side, when the temperature of the cooling water flowing through the battery flow path 3c is equal to or greater than a third temperature T3 higher than the second temperature T2. If the temperature of the cooling water flowing through the battery flow path 3c is extremely high, the cooling water is cooled by the chiller 27 by operation of the refrigeration circuit 2. Therefore, in such a case, there is no need to cool the cooling water by the low temperature radiator. For this reason, in the present embodiment, when the temperature of the cooling water is equal to or greater than the third temperature T3, the switching position of the second three-way valve 39 is set to the battery bypass flow path 3e side.

Control of Pumps in Low Temperature Circuit

Figure 14A:
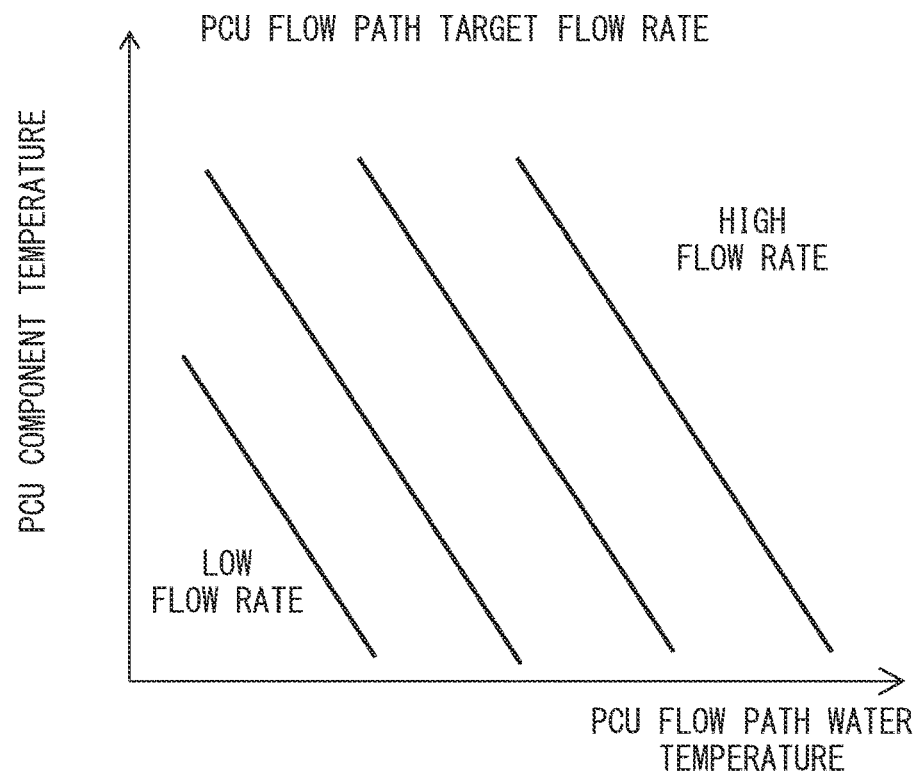
FIGS. 14A and 14B are views showing a method of setting target flow rates of the cooling water in a PCU flow path and battery flow path.
Figure 14B:
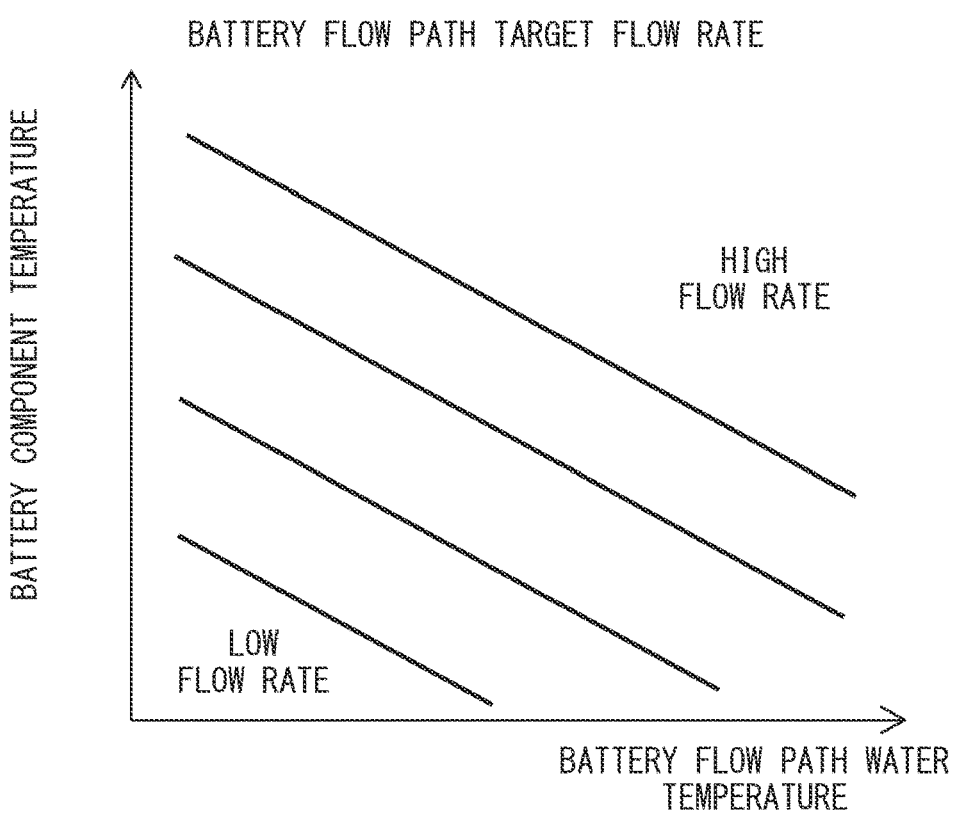
Figure 15A:
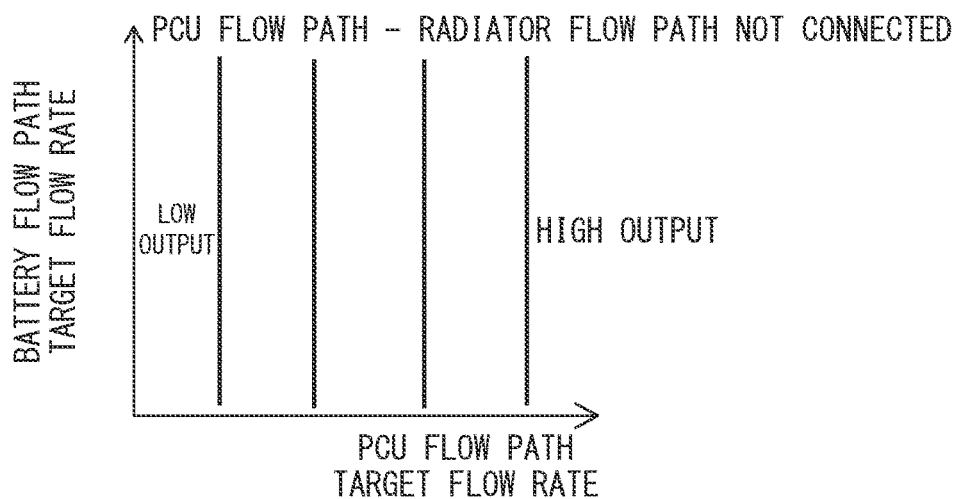
FIGS. 15A to 15C are views showing a method of setting a target output of a first pump provided in the PCU flow path.
Figure 15B:
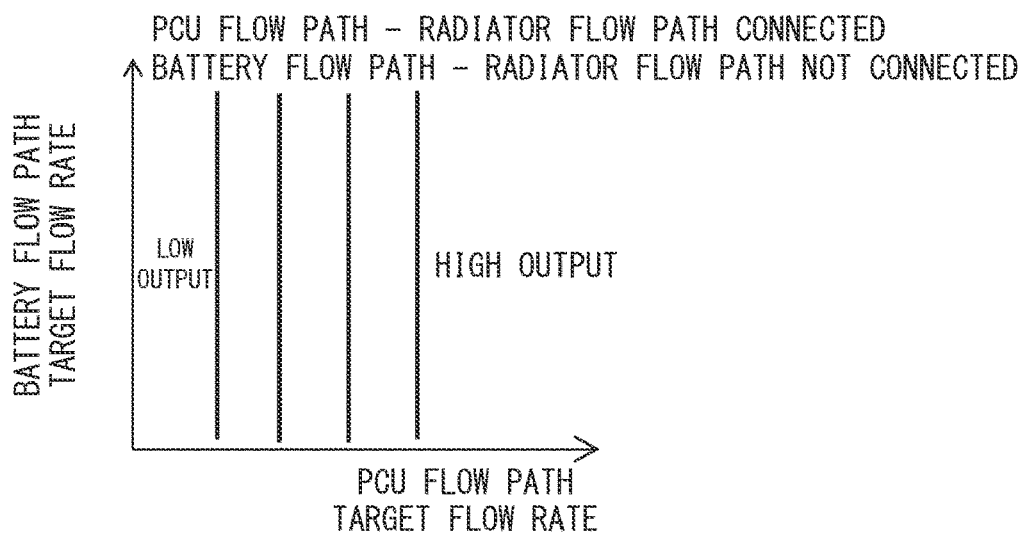
Figure 15C:
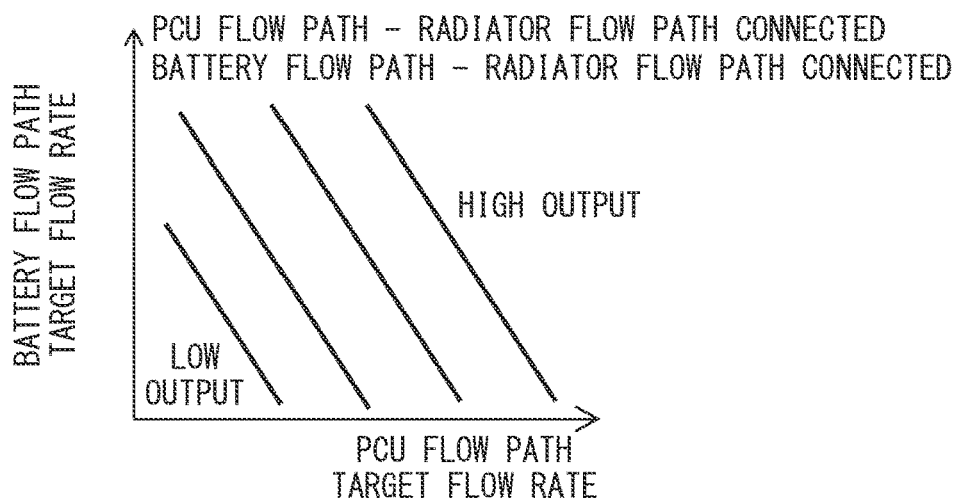
Figure 16A:
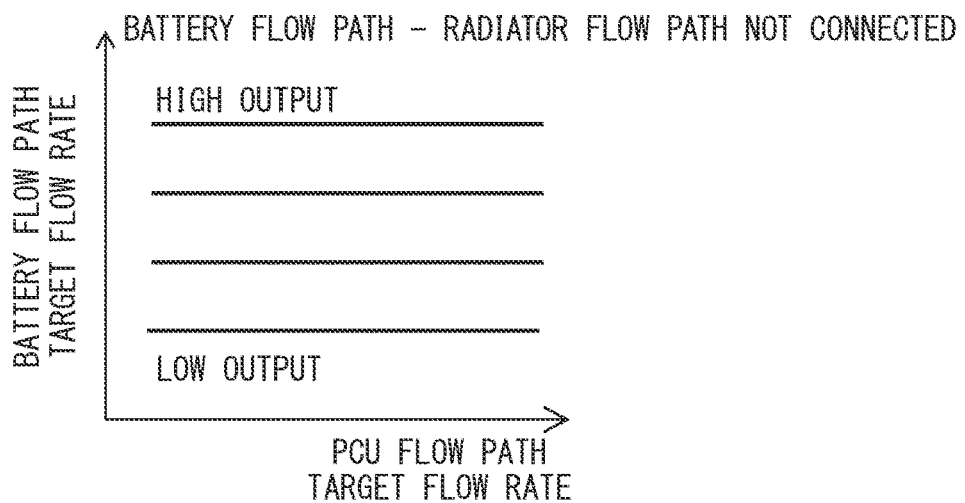
FIGS. 16A to 16C are views showing a method of setting a target output of a second pump provided in the battery flow path.
Figure 16B:
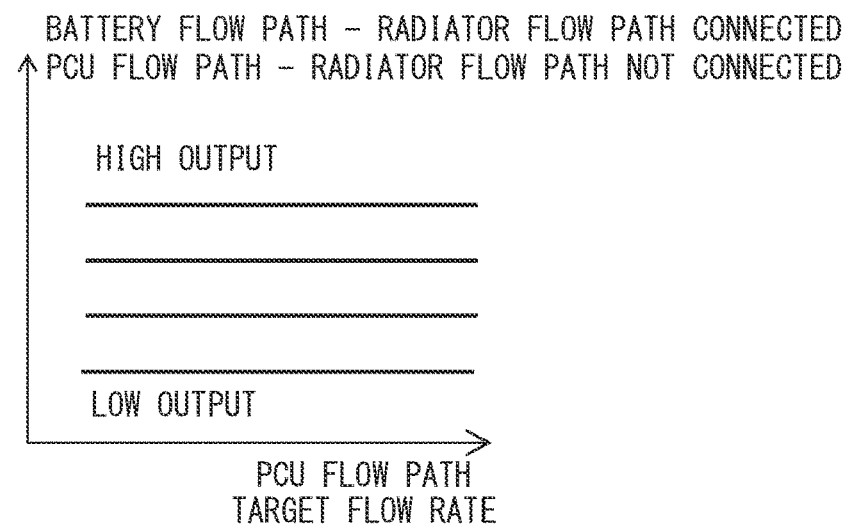
Figure 16C:
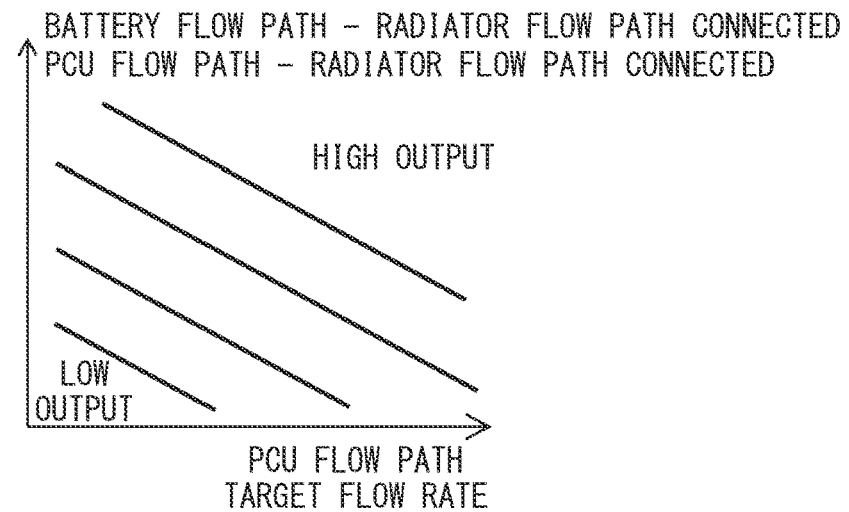

Next, referring to FIGS. 14A to 16C, control of the first pump 31 and second pump 32 at the low temperature circuit 3 will be explained. FIGS. 14A and 14B are views showing the method of setting the target flow rates of the cooling water of the PCU flow path 3b and the battery flow path 3c. Further, FIGS. 15A to 15C are views showing the method of setting the target output of the first pump 31 provided at the PCU flow path 3b. Furthermore, FIGS. 16A to 16C are views showing the method of setting the target output of the second pump 32 provided at the battery flow path 3c.

In the present embodiment, the target flow rate at the PCU flow path 3b of the cooling water is set based on the temperature of the cooling water flowing through the PCU flow path 3b and the element temperature of the PCU 118. Specifically, the target flow rate, as shown in FIG. 14A, is set to be larger as the temperature of the cooling water flowing through the PCU flow path 3b is higher, and to be larger as the element temperature of the PCU 118 is higher. In particular, in the present embodiment, the target flow rate is set so that, compared with the element temperature of the PCU 118, the temperature of the cooling water flowing through the PCU flow path 3b is relatively large in effect on the target flow rate. This is because the element temperature of the PCU 118 (or the parts forming the PCU 118) greatly fluctuates according to the load of the motor, etc., therefore even if changing the target flow rate in accordance with the element temperature of the PCU 118, it is difficult to suitably control the element temperature of the PCU 118.

Further, in the present embodiment, the target flow rate at the battery flow path 3c of the cooling water is set based on the temperature of the cooling water flowing through the battery flow path 3c and the element temperature of the battery. Specifically, the target flow rate, as shown in FIG. 14B, is set so as to be larger as the temperature of the cooling water flowing through the battery flow path 3c is higher, and to be larger as the element temperature of the battery is higher. In particular, in the present embodiment, the target flow rate is set so that, compared with the temperature of the cooling water flowing through the battery flow path 3c, the element temperature of the battery is relatively large in effect on the target flow rate. This is because since the battery is large in heat capacity and small in fluctuation corresponding to the load of the motor, etc., if changing the target flow rate according to the element temperature of the battery, the element temperature of the battery can be easily suitably controlled.

Note that, in the present embodiment, the target flow rate at the PCU flow path 3b of the cooling water is set based on the temperature of the cooling water flowing through the PCU flow path 3b and the element temperature of the PCU 118. However, it is not necessarily required to set the target flow rate based on these two temperatures. It is also possible to set the target flow rate based on only one among them (for example, only the temperature of the cooling water flowing through the PCU flow path 3b) or based on other parameters. Similarly, in the present embodiment, the target flow rate at the battery flow path 3c of the cooling water is set based on the temperature of the cooling water flowing through the battery flow path 3c and the element temperature of the battery. However, it is not necessarily required to set the target flow rate based on these two temperatures. The target flow rate can also be set based on only one of them (for example, only the element temperature of the battery) or based on other parameters.

The outputs of the first pump 31 provided at the PCU flow path 3b and the second pump 32 provided at the battery flow path 3c are set, based on the target flow rates of the PCU flow path 3b and the battery flow path 3c set in the above way. Note that, the outputs of these pumps are adjusted by changing the duty ratios of the electric power supplied to the pumps, or changing the values of the current or values of the voltage supplied to the pumps. Further, the rotational speeds of the pumps are changed by changing the outputs of these pumps.

Here, in the present embodiment, the PCU flow path 3b and battery flow path 3c are connected in parallel to the low temperature radiator flow path 3a. Therefore, if changing the output of the first pump 31 in the state where the first three-way valve 38 and the second three-way valve 39 are both set to the low temperature radiator flow path 3a side, not only the flow rate of the cooling water flowing through the PCU flow path 3b, but also the flow rate of the cooling water flowing through the battery flow path 3c changes. Similarly, if changing the output of the second pump 32 in the state where the first three-way valve 38 and the second three-way valve 39 are both set to the low temperature radiator flow path 3a side, not only the flow rate of the cooling water flowing through the battery flow path 3c, but also the flow rate of the cooling water flowing through the PCU flow path 3b changes.

Therefore, in the present embodiment, the respective outputs of the pumps 31, 32 are set based on the target flow rate of the cooling water flowing through the PCU flow path 3b and the target flow rate of the cooling water flowing through the battery flow path 3c.

Specifically, the target output of the first pump 31 is set as shown in FIGS. 15A to 15C. FIG. 15A shows the target output of the first pump 31 in the case where the first three-way valve 38 is set to the PCU bypass flow path 3d side. In this case, the PCU flow path 3b is not connected to the low temperature radiator flow path 3a, therefore the target output of the first pump 31 is not affected by the target flow rate of the cooling water flowing through the battery flow path 3c. For this reason, as shown in FIG. 15A, the target output of the first pump 31 changes only based on the target flow rate of the cooling water flowing through the PCU flow path 3b. Specifically, the target output of the first pump 31 is higher as the target flow rate of the cooling water flowing through the PCU flow path 3b is larger.

FIG. 15B shows the target output of the first pump 31 in the case where the first three-way valve 38 is set to the low temperature radiator flow path 3a side and the second three-way valve 39 is set to the battery bypass flow path 3e side. In this case, the battery flow path 3c is not connected to the low temperature radiator flow path 3a, therefore the target output of the first pump 31 is not affected by the target flow rate of the cooling water flowing through the battery flow path 3c. For this reason, as shown in FIG. 15B, the target output of the first pump 31 changes based on only the target flow rate of the cooling water flowing through the PCU flow path 3b. However, in this case, due to the PCU flow path 3b being connected to the low temperature radiator flow path 3a, compared with the case where it is connected to the PCU bypass flow path 3d, the flow path resistance is larger. For this reason, in the case shown in FIG. 15B, compared with the case shown in FIG. 15A, the target output of the first pump 31 with respect to the same target flow rate of the cooling water flowing through the PCU flow path 3b is higher.

FIG. 15C shows the target output of the first pump 31 in the case where the first three-way valve 38 and the second three-way valve 39 are both set to the low temperature radiator flow path 3a side. In this case, the target output of the first pump 31 is affected by both the target flow rate of the cooling water flowing through the PCU flow path 3b and the target flow rate of the cooling water flowing through the battery flow path 3c. For this reason, as shown in FIG. 15C, the target output of the first pump 31 changes based on the target flow rate of the cooling water flowing through the PCU flow path 3b, and the target flow rate of the cooling water flowing through the battery flow path 3c. Specifically, as shown in FIG. 15C, the target output of the first pump 31 provided at the PCU flow path 3b is set so as to be higher as the target flow rate of the cooling water flowing through the PCU flow path 3b is larger and as the target flow rate of the cooling water flowing through the battery flow path 3c is larger.

On the other hand, the target output of the second pump 32 is set as shown in FIGS. 16A to 16C. FIG. 16A shows the target output of the second pump 32 in the case where the second three-way valve 39 is set to the battery bypass flow path 3e side. In this case, the battery flow path 3c is not connected to the low temperature radiator flow path 3a, therefore the target output of the second pump 32 is not affected by the target flow rate of the cooling water flowing through the PCU flow path 3b. For this reason, as shown in FIG. 16A, the target output of the second pump 32 changes based on only the target flow rate of the cooling water flowing through the battery flow path 3c. Specifically, the target output of the second pump 32 is higher as the target flow rate of the cooling water flowing through the battery flow path 3c is larger.

FIG. 16B shows the target output of the second pump 32 in the case where the second three-way valve 39 is set to the low temperature radiator flow path 3a side and the first three-way valve 38 is set to the PCU bypass flow path 3d side. In this case, the PCU flow path 3b is not connected to the low temperature radiator flow path 3a, therefore the target output of the second pump 32 is not affected by the target flow rate of the cooling water flowing through the PCU flow path 3b. For this reason, as shown in FIG. 16B, the target output of the second pump 32 changes based on only the target flow rate of the cooling water flowing through the battery flow path 3c. However, in this case, due to the battery flow path 3c being connected to the low temperature radiator flow path 3a, compared with the case where it is connected to the battery bypass flow path 3e, the flow path resistance is larger. For this reason, in the case shown in FIG. 16B, compared with the case shown in FIG. 16A, the target output of the first pump 31 with respect to the same target flow rate of the cooling water flowing through the battery flow path 3c is higher.

FIG. 16C shows the target output of the second pump 32 in the case where the first three-way valve 38 and the second three-way valve 39 are set to the low temperature radiator flow path 3a side. In this case, the target output of the second pump 32 is affected by both the target flow rate of the cooling water flowing through the PCU flow path 3b and the target flow rate of the cooling water flowing through the battery flow path 3c. For this reason, as shown in FIG. 16C, the target output of the second pump 32 changes based on the target flow rate of the cooling water flowing through the PCU flow path 3b and the target flow rate of the cooling water flowing through the battery flow path 3c. Specifically, as shown in FIG. 16 C, the target output of the second pump 32 provided at the battery flow path 3c is set so as to be higher as the target flow rate of the cooling water flowing through the PCU flow path 3b is larger and as the target flow rate of the cooling water flowing through the battery flow path 3c is larger.

Control of Pumps when Changing Flow Rate

In the low temperature circuit 3 configured as above, if changing the switching position of the first three-way valve 38 or the second three-way valve 39 to switch the flow state of the cooling water at the low temperature circuit 3, the output of at least one of the first pump 31 and second pump 32 is changed.

Figure 17:
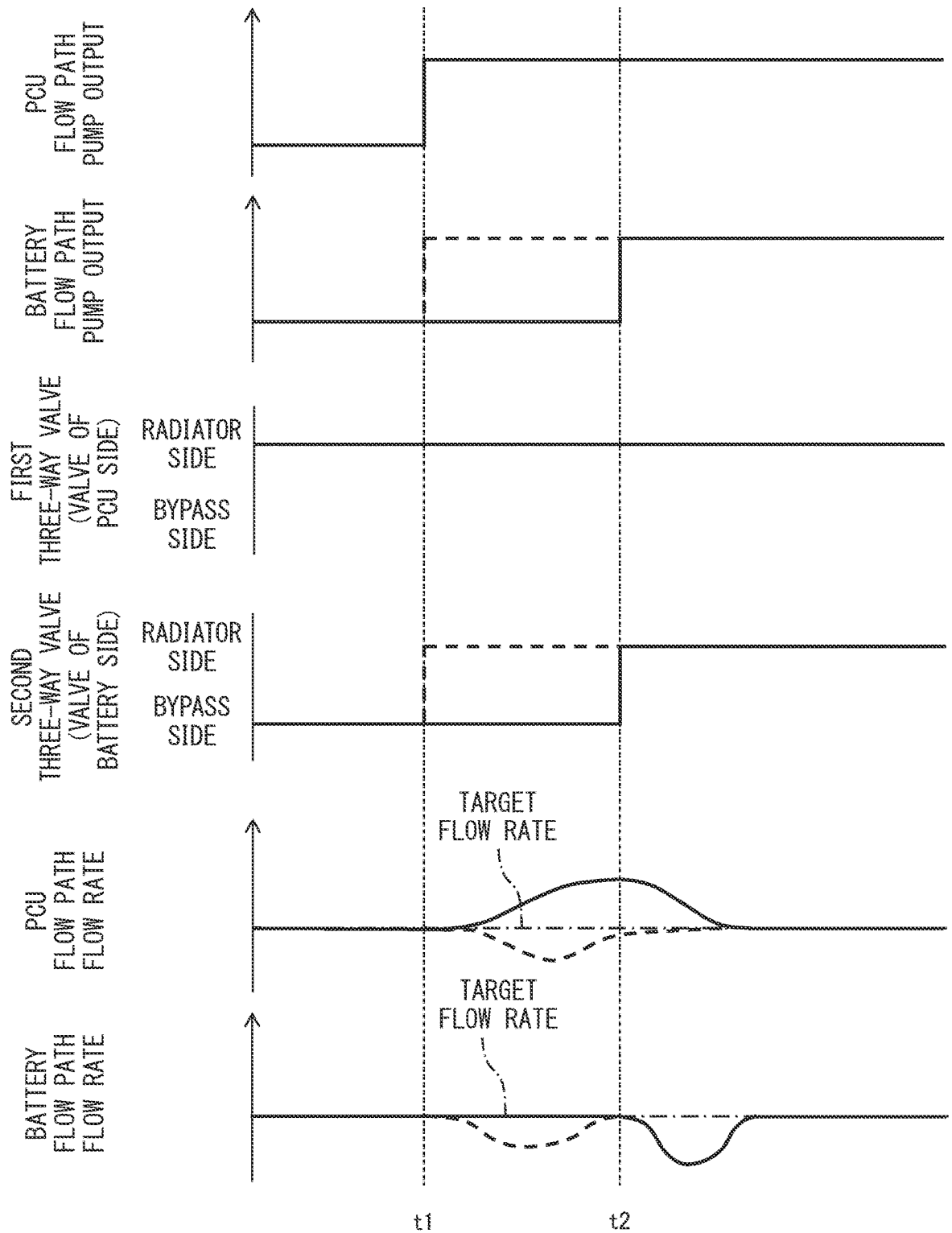
FIG. 17 is a time chart of output of the first pump, etc., in the case of switching a flow state of the cooling water from the flow state B to the flow state A.

FIG. 17 is a time chart of parameters, such as the output of the first pump (pump of PCU flow path 3b) 31, the output of the second pump (pump of battery flow path 3c), the switching position of the first three-way valve 38 (three-way valve provided at the PCU flow path 3b), the switching position of the second three-way valve 39 (three-way valve provided in battery flow path 3c), the flow rate of the cooling water at the PCU flow path 3b, and the flow rate of the cooling water at the battery flow path 3c, in the case of switching the flow state of the cooling water at the low temperature circuit 3 from the flow state B (FIG. 10) to the flow state A (FIG. 9). As shown in FIG. 17, along with switching the second three-way valve 39 from the battery bypass flow path 3e side to the low temperature radiator flow path 3a side, the outputs of the first pump 31 and the second pump 32 are both raised.

The broken line of FIG. 17 shows the case where, at the time t1, at the same time as the second three-way valve 39, the outputs of the first pump 31 and the second pump 32 are raised. In the example shown in FIG. 17, in this case, right after the time t1, the flow rate of the PCU flow path 3b temporarily decreases to less than the target flow rate, and the flow rate of the battery flow path 3c temporarily falls below the target flow rate. In this way, if the outputs of the first pump 31 and the second pump 32 are simultaneously raised, the flow rate of the PCU flow path 3b may be temporarily less than the target flow rate in accordance with the viscosity of the cooling water or the temperature of the cooling water in each flow path, the magnitude of the pump drive voltage, etc.

Here, as explained above, the element temperature of the PCU 118 (or parts forming the PCU 118) greatly fluctuates in accordance with the load of the motor, etc. For this reason, the PCU heat exchanger 36 has to be constantly supplied with a certain amount of the cooling water so that the PCU 118 can be sufficiently cooled even if the element temperature rapidly rises. In this regard, as explained above, if the flow rate of the PCU flow path 3b temporarily becomes less than the target flow rate, it becomes impossible to sufficiently cool the element when the element temperature rapidly rises, and the temperature of the element of the PCU 118 is liable to be excessively raised.

Therefore, in the present embodiment, as shown in FIG. 17 by the solid lines, when switching the second three-way valve 39 from the battery bypass flow path 3e side to the low temperature radiator flow path 3a side, the output of the first pump 31 is raised before switching the second three-way valve 39. Specifically, in the example shown in FIG. 17, at the time t1, the output of the first pump 31 is raised. At the time t2 after a predetermined time has elapsed from the time t1, the second three-way valve 39 is switched and the output of the second pump 32 is raised. As a result, as shown in FIG. 17 by the solid lines, the flow rate of the PCU flow path 3b temporarily becomes larger than the target flow rate. For this reason, the flow rate of the PCU flow path 3b is kept from temporarily being less than the target flow rate and accordingly an excessive rise in temperature of the element of the PCU 118 is suppressed.

Here, the predetermined time from the time t1 to the time t2 is set to a time where the flow rate of the PCU flow path 3b is always temporarily larger than the target flow rate, regardless of the viscosity of the cooling water, the temperature of the cooling water at each flow path, or magnitude of the pump drive voltage, etc.

Figure 18:
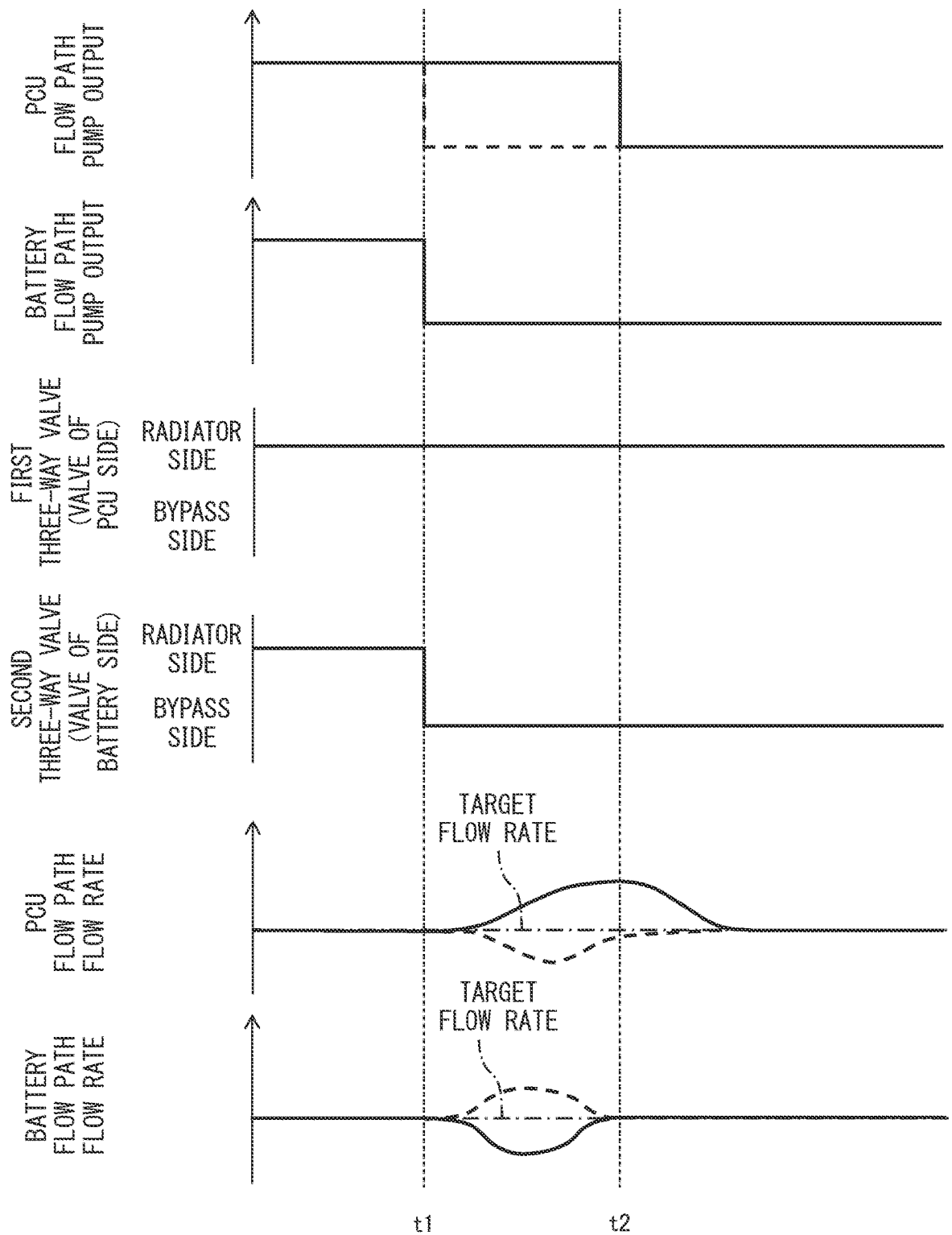
FIG. 18 is a time chart of output of the first pump, etc., in the case of switching a flow state of the cooling water from the flow state A to the flow state B.

FIG. 18 is a time chart of the output of the first pump 31, etc., in the case of switching the flow state of the cooling water at the low temperature circuit 3 from the flow state A (FIG. 9) to the flow state B (FIG. 10). As shown in FIG. 18, along with switching the second three-way valve 39 from the low temperature radiator flow path 3a side to the battery bypass flow path 3e side, the outputs of the first pump 31 and the second pump 32 are both decreased.

The broken line in FIG. 18 shows the case where, at the time t1, the outputs of the first pump 31 and the second pump 32 are lowered at the same time as switching the second three-way valve 39. As will be understood from FIG. 18, in this case, the flow rate of the PCU flow path 3b may temporarily decrease to less than the target flow rate.

Therefore, in the present embodiment, as shown in FIG. 18 by the solid lines, when switching the second three-way valve 39 from the low temperature radiator flow path 3a side to the battery bypass flow path 3e side, the output of the first pump 31 is lowered after switching the second three-way valve 39. Specifically, in the example shown in FIG. 18, at the time t1, the second three-way valve 39 is switched and the output of the second pump 32 is raised. At the time t2 after the elapse of a predetermined time from the time t1, the output of the first pump 31 is raised. As a result, as shown in FIG. 18 by the solid lines, the flow rate of the PCU flow path 3b temporarily becomes larger than the target flow rate. Accordingly, excessive rise in temperature of the element of the PCU 118 is suppressed. The predetermined time from the time t1 to the time t2 is set to a time where the flow rate of the PCU flow path 3b is always temporarily larger than the target flow rate regardless of the viscosity of the cooling water, etc.

FIGS. 17 to 18 are time charts of the timings of changes of the outputs of the first pump 31 and the second pump 32, etc., in the case of switching the flow state of the cooling water at the low temperature circuit 3 between the flow state A (FIG. 9) and the flow state B (FIG. 10). Even when switching the flow state of the cooling water at the low temperature circuit 3 with between other states, in the same way as the case shown in FIGS. 17 to 18, the outputs of the first pump 31 and the second pump 32 are switched so that the flow rate of the PCU flow path 3b becomes temporarily larger than the target flow rate. Below, referring to FIGS. 19 to 28, the timings of switching the outputs of the first pump 31 and the second pump 32 when switching the flow state of the cooling water at the low temperature circuit 3 between other states will be explained. Note that, in FIGS. 19 to 28, the broken lines show the trends in the cases of changing the outputs of the first pump 31 and the second pump 32 at the same time as switching the three-way valves 38, 39 at the time t1. On the other hand, the solid lines show the trends in the case of changing the output of at least one of the first pump 31 and second pump 32 at a timing different from switching of the three-way valves 38, 39.

Figure 19:
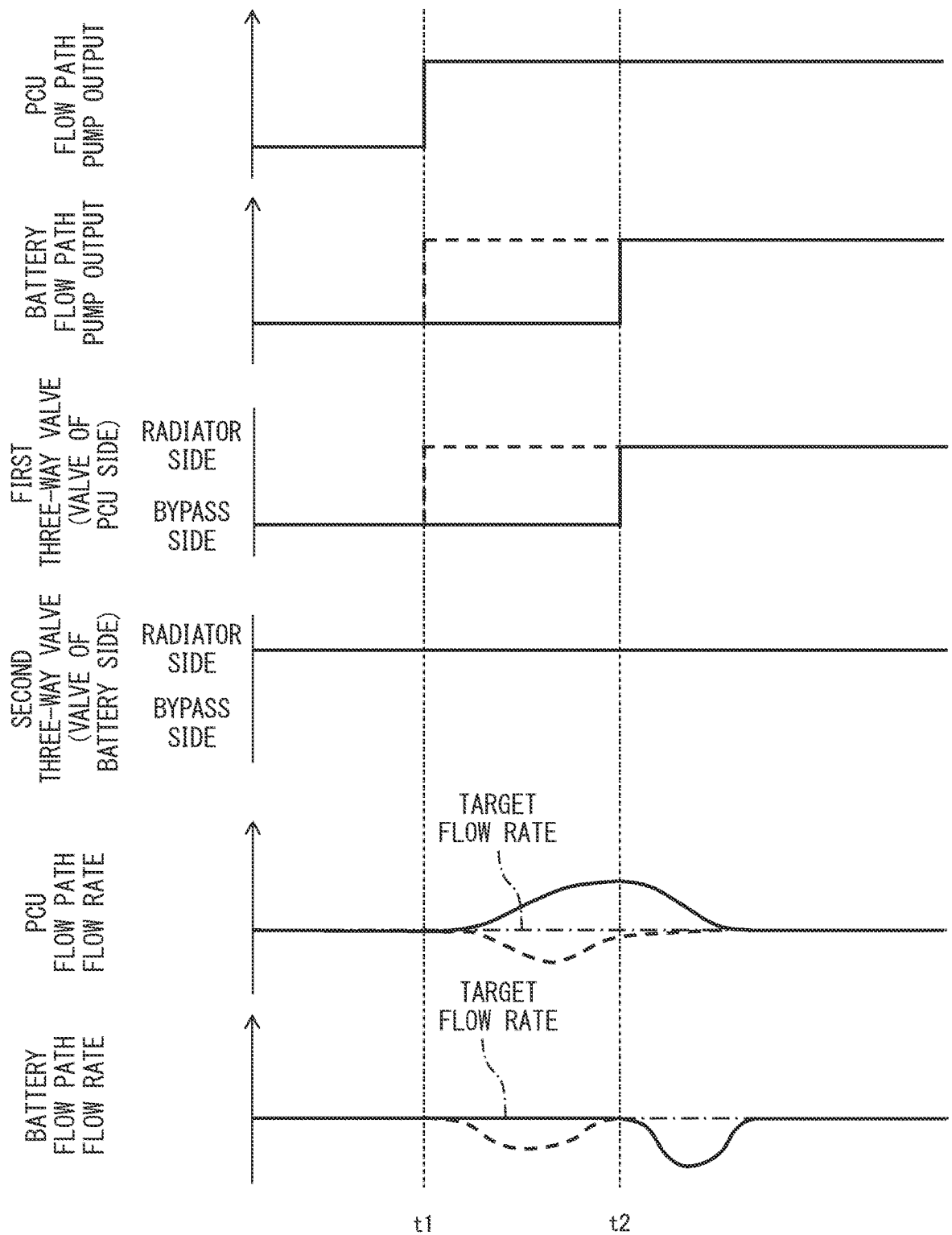
FIG. 19 is a time chart of output of the first pump, etc., in the case of switching a flow state of the cooling water from the flow state C to the flow state A.

FIG. 19 is a time chart of the output of the first pump 31, etc., in the case of switching the flow state of the cooling water at the low temperature circuit 3 from the flow state C (FIG. 11) to the flow state A (FIG. 9). As shown in FIG. 19, in the present embodiment, at the time t2, the first three-way valve 38 is switched from the PCU bypass flow path 3*d* side to the low temperature radiator flow path 3*a* side, and the output of the first pump 31 is raised at the time t1 before the output of the second pump 32 is raised. As a result, as shown in FIG. 19 by the solid lines, the flow rate of the PCU flow path 3*b* is temporarily larger than the target flow rate, and accordingly excessive rise in temperature of the element of the PCU 118 is suppressed.

Figure 20:
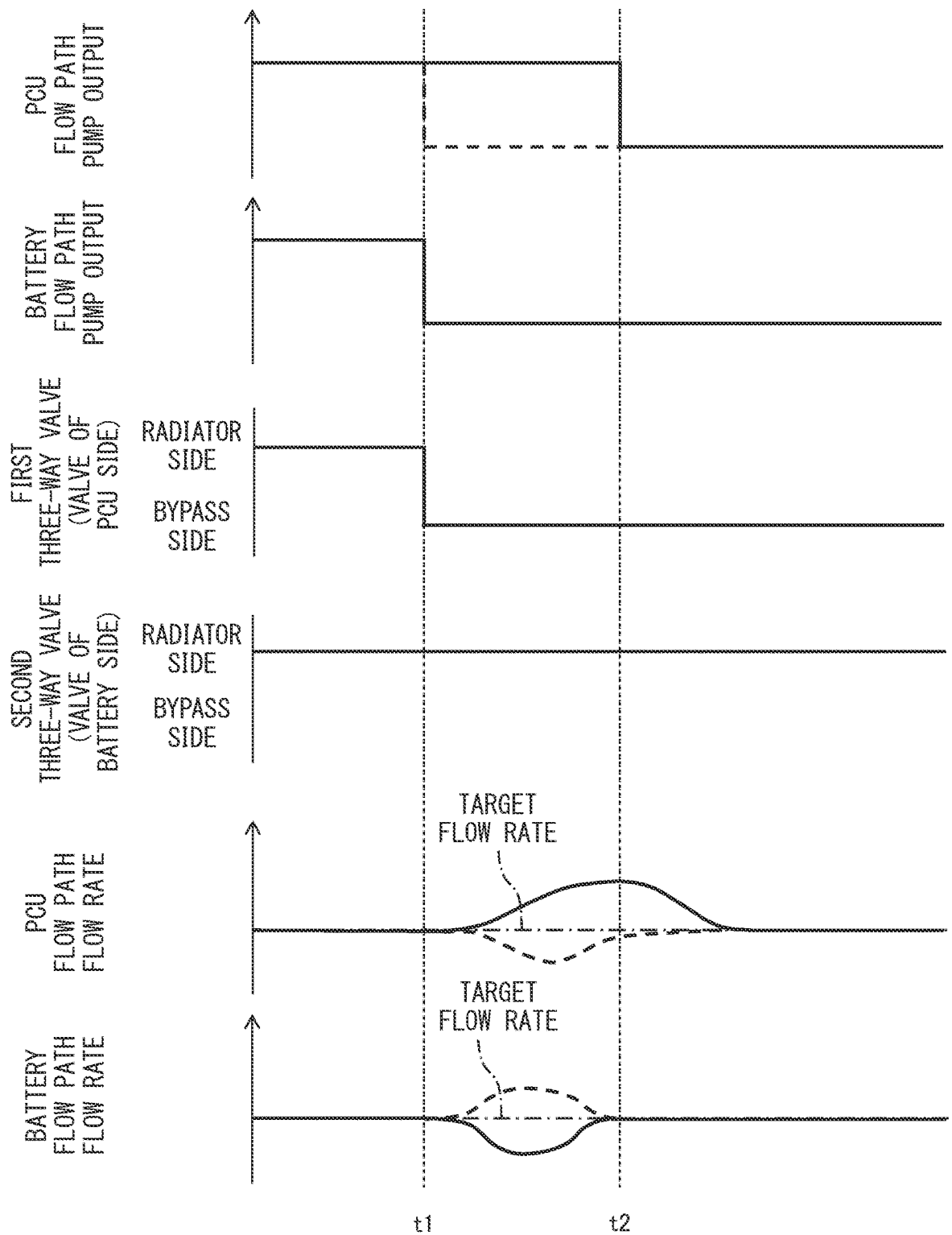
FIG. 20 is a time chart of output of the first pump, etc., in the case of switching a flow state of the cooling water from the flow state A to the flow state C.

FIG. 20 is a time chart of the output of the first pump 31, etc., in the case of switching the flow state of the cooling water at the low temperature circuit 3 from the flow state A (FIG. 9) to the flow state C (FIG. 11). As shown in FIG. 20, in the present embodiment, at the time t1, the first three-way valve 38 is switched from the low temperature radiator flow path 3*a* side to the PCU bypass flow path 3*d* side, and the output of the second pump 32 is lowered, then at the time t2, the output of the first pump 31 is lowered. As a result, as shown in FIG. 20 by the solid line, the flow rate of the PCU flow path 3*b* is temporarily larger than the target flow rate whereby excessive rise in temperature of the element of the PCU 118 is suppressed.

Figure 21:
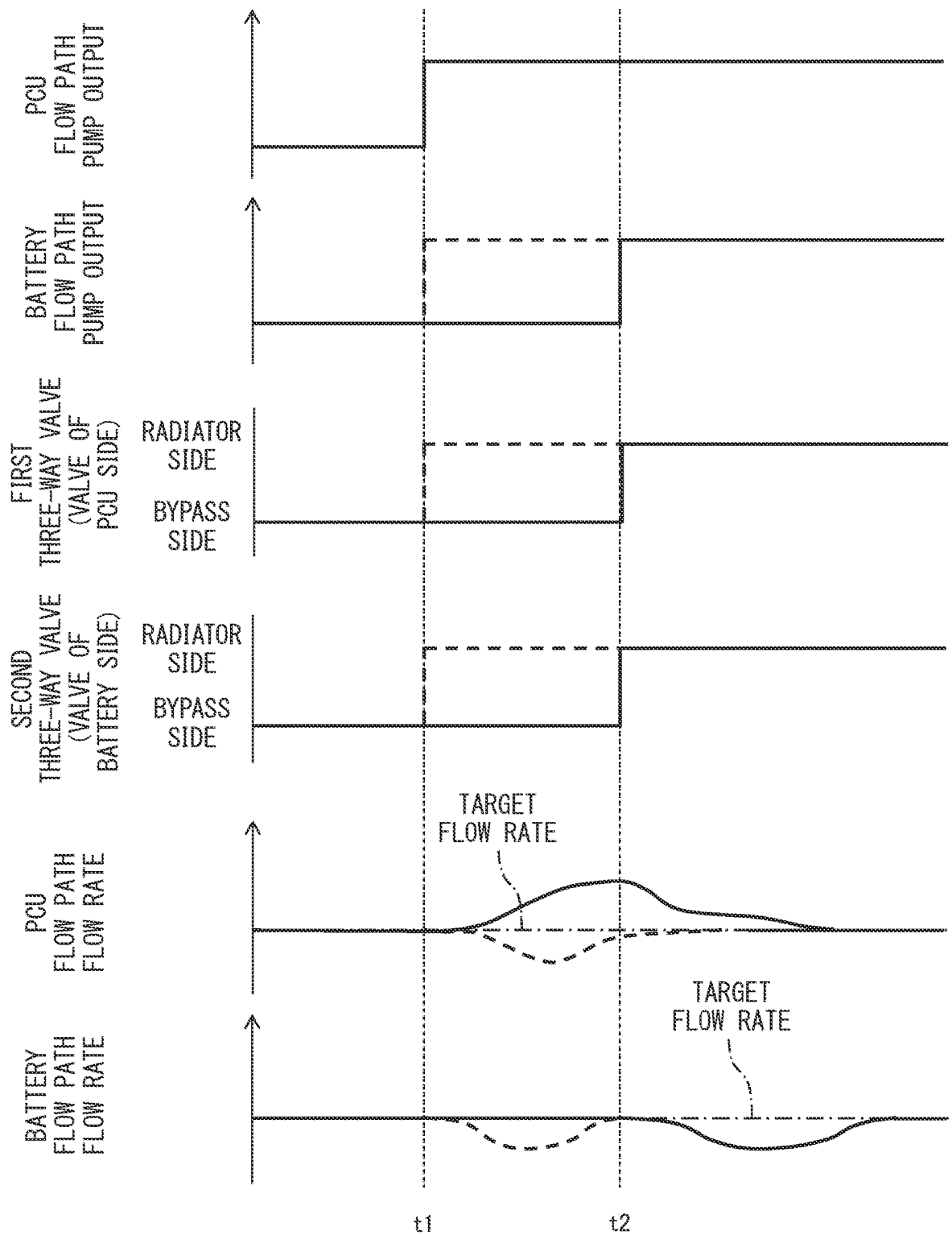
FIG. 21 is a time chart of output of the first pump, etc., in the case of switching a flow state of the cooling water from the flow state D to the flow state A.

FIG. 21 is a time chart of the output of the first pump 31, etc., in the case of switching the flow state of the cooling water at the low temperature circuit 3 from the flow state D (FIG. 12) to the flow state A (FIG. 9). As shown in FIG. 21, in the present embodiment, at the time t2, the first three-way valve 38 is switched from the PCU bypass flow path 3*d* side to the low temperature radiator flow path 3*a* side, the second three-way valve 39 is switched from the battery bypass flow path 3*e* side to the low temperature radiator flow path 3*a* side, and at the time t1, the output of the first pump 31 is raised before the output of the second pump 32 is raised. As a result, as shown in FIG. 21 by the solid lines, the flow rate of the PCU flow path 3*b* is temporarily larger than the target flow rate. Accordingly, excessive rise of temperature of the element of the PCU 118 is suppressed.

Figure 22:
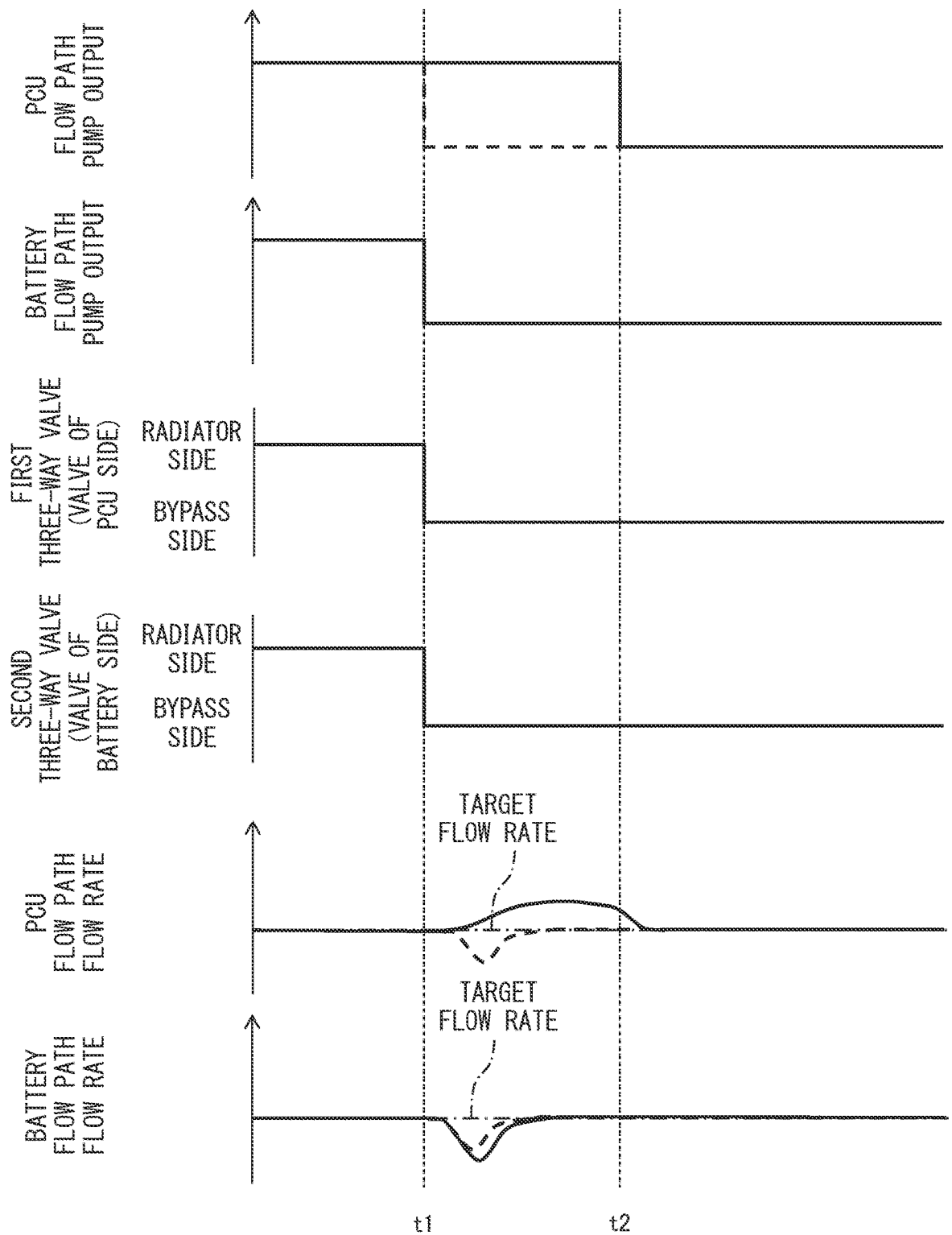
FIG. 22 is a time chart of output of the first pump, etc., in the case of switching a flow state of the cooling water from the flow state A to the flow state D.

FIG. 22 is a time chart of the output of the first pump 31, etc., in the case of switching the flow state of the cooling water at the low temperature circuit 3 from the flow state A (FIG. 9) to the flow state D (FIG. 12). As shown in FIG. 22, in the present embodiment, at the time t1, the first three-way valve 38 is switched from the low temperature radiator flow path 3*a* side to the PCU bypass flow path 3*d* side, the second three-way valve 39 is switched from the low temperature radiator flow path 3*a* side to the battery bypass flow path 3*e* side, and the output of the second pump 32 is lowered, and then at the time t2, the output of the first pump 31 is lowered. As a result, as shown in FIG. 22 by the solid lines, the flow rate of the PCU flow path 3*b* is temporarily larger than the target flow rate, and accordingly an excessive rise in temperature of the element of the PCU 118 is suppressed.

Figure 23:
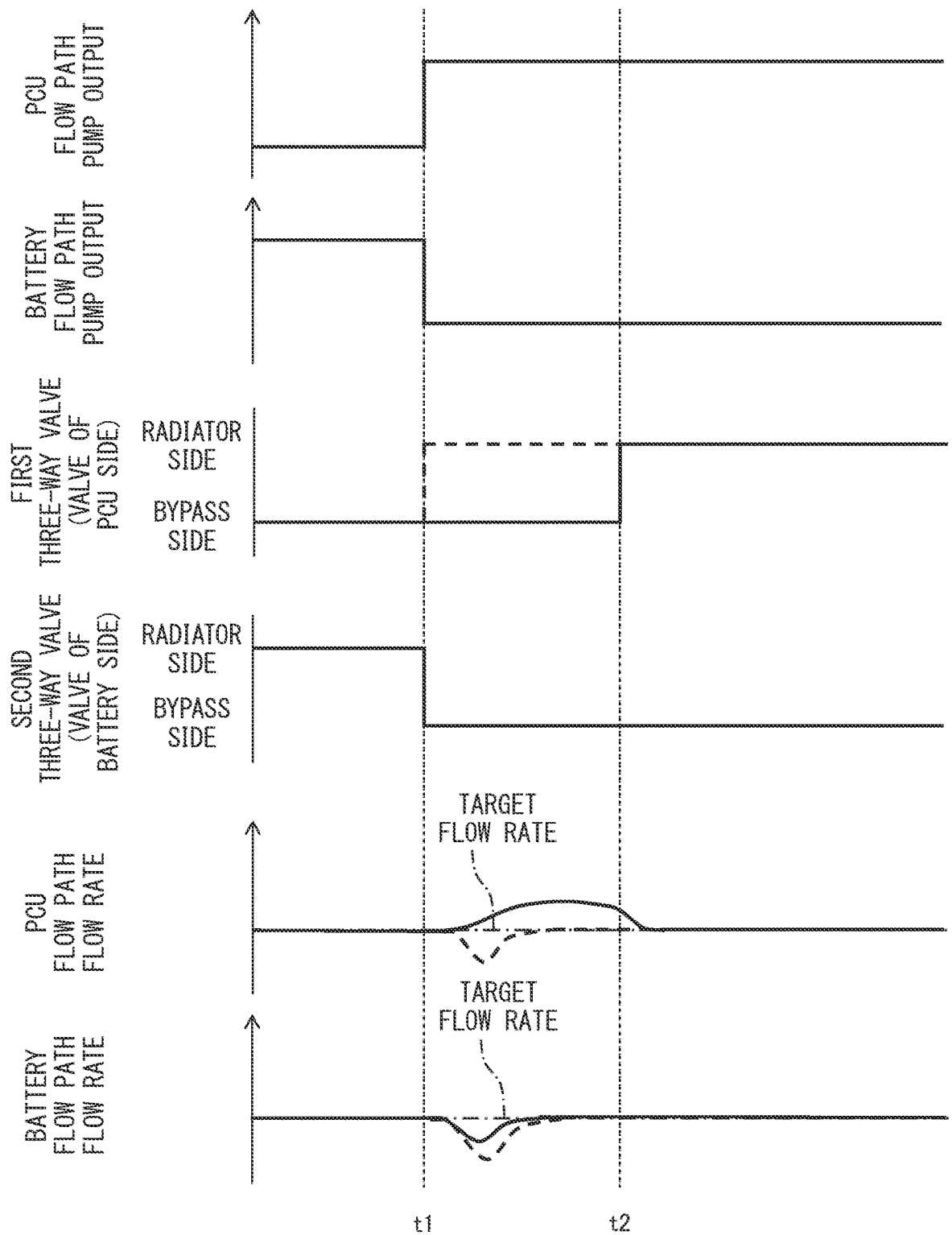
FIG. 23 is a time chart of output of the first pump, etc., in the case of switching a flow state of the cooling water from the flow state C to the flow state B.

FIG. 23 is a time chart of the output of the first pump 31, etc., in the case of switching the flow state of the cooling water at the low temperature circuit 3 from the flow state C (FIG. 11) to the flow state B (FIG. 10). As shown in FIG. 23, in the present embodiment, before the first three-way valve 38 is switched from the PCU bypass flow path 3*d* side to the low temperature radiator flow path 3*a* side at the time t2, the second three-way valve 39 is switched from the low temperature radiator flow path 3*a* side to the battery bypass flow path 3*e* side at the time t1, the output of the first pump 31 is raised, and the output of the second pump 32 is lowered. As a result, as shown in FIG. 23 by the solid lines, the flow rate of the PCU flow path 3*b* is temporarily larger than the target flow rate, and accordingly an excessive rise in temperature of the element of the PCU 118 is suppressed.

Figure 24:
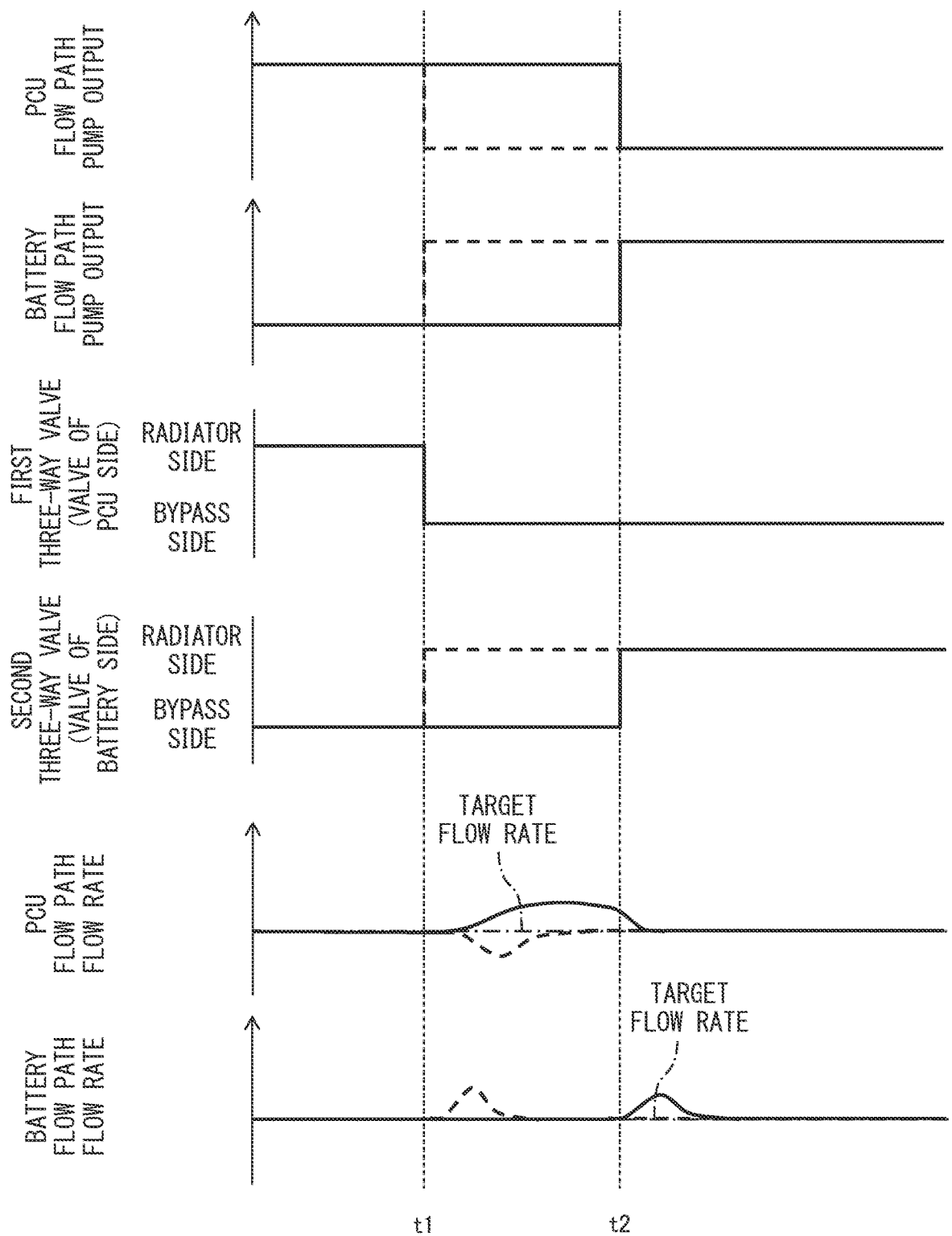
FIG. 24 is a time chart of output of the first pump, etc., in the case of switching a flow state of the cooling water from the flow state B to the flow state C.

FIG. 24 is a time chart of the output of the first pump 31, etc., in the case of switching the flow state of the cooling water at the low temperature circuit 3 from the flow state B (FIG. 10) to the flow state C (FIG. 11). As shown in FIG. 24, in the present embodiment, at the time t1, the first three-way valve 38 is switched from the low temperature radiator flow path 3*a* side to the PCU bypass flow path 3*d* side, then, at the time t2, the second three-way valve 39 is switched from the battery bypass flow path 3*e* side to the low temperature radiator flow path 3*a* side, the output of the first pump 31 is lowered, and the output of the second pump 32 is raised. As a result, as shown in FIG. 24 by the solid lines, the flow rate of the PCU flow path 3*b* is temporarily larger than the target flow rate, and accordingly an excessive rise in temperature of the element of the PCU 118 is suppressed.

Figure 25:
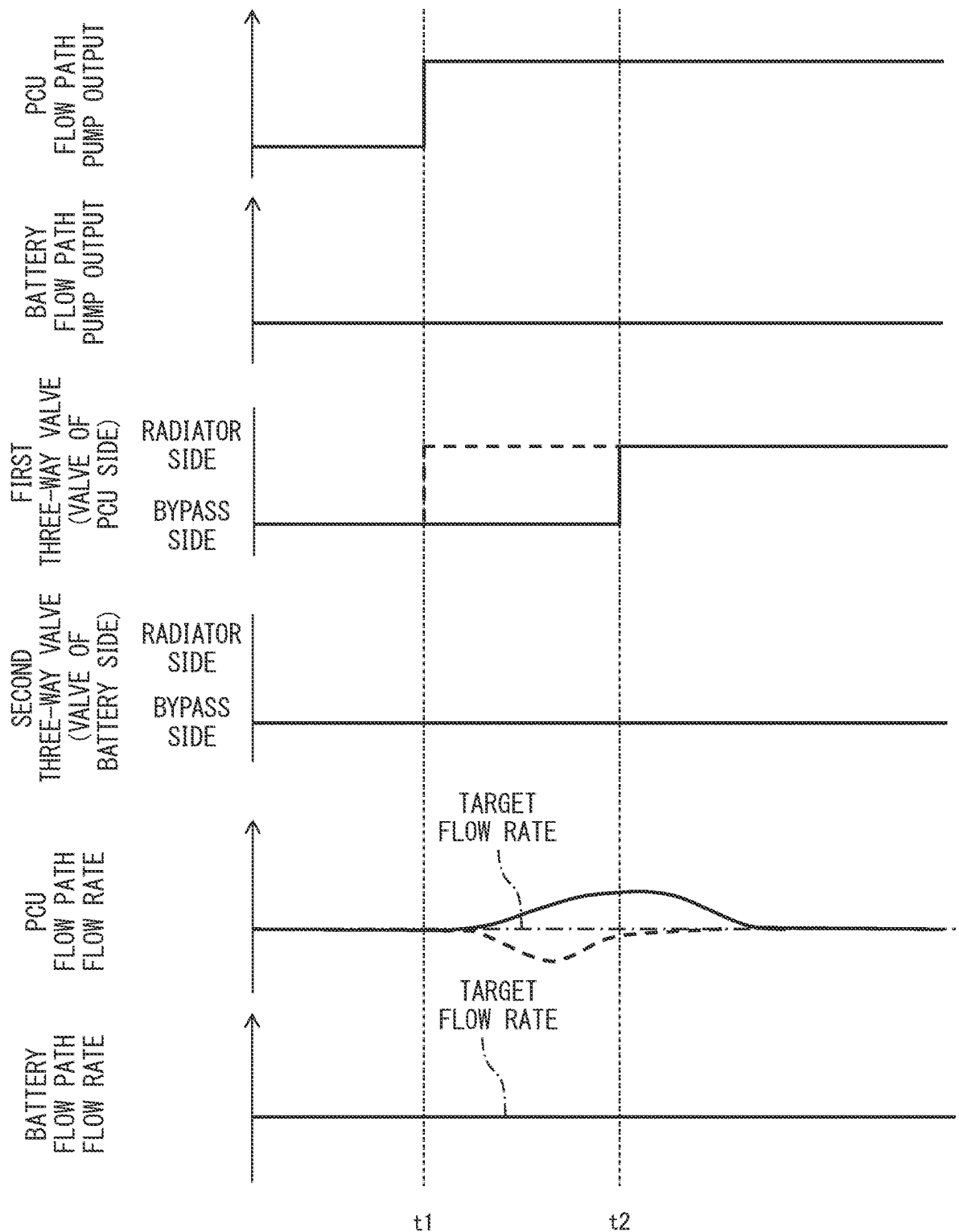
FIG. 25 is a time chart of output of the first pump, etc., in the case of switching a flow state of the cooling water from the flow state D to the flow state B.

FIG. 25 is a time chart of the output of the first pump 31, etc., in the case of switching the flow state of the cooling water at the low temperature circuit 3 from the flow state D (FIG. 12) to the flow state B (FIG. 10). As shown in FIG. 25, in the present embodiment, before the first three-way valve 38 is switched from the PCU bypass flow path 3*d* side to the low temperature radiator flow path 3*a* side at the time t2, the output of the first pump 31 is raised at the time t1. As a result, as shown in FIG. 25 by the solid line, the flow rate of the PCU flow path 3*b* is temporarily larger than the target flow rate, and accordingly an excessive rise in temperature of the element of the PCU 118 is suppressed.

Figure 26:
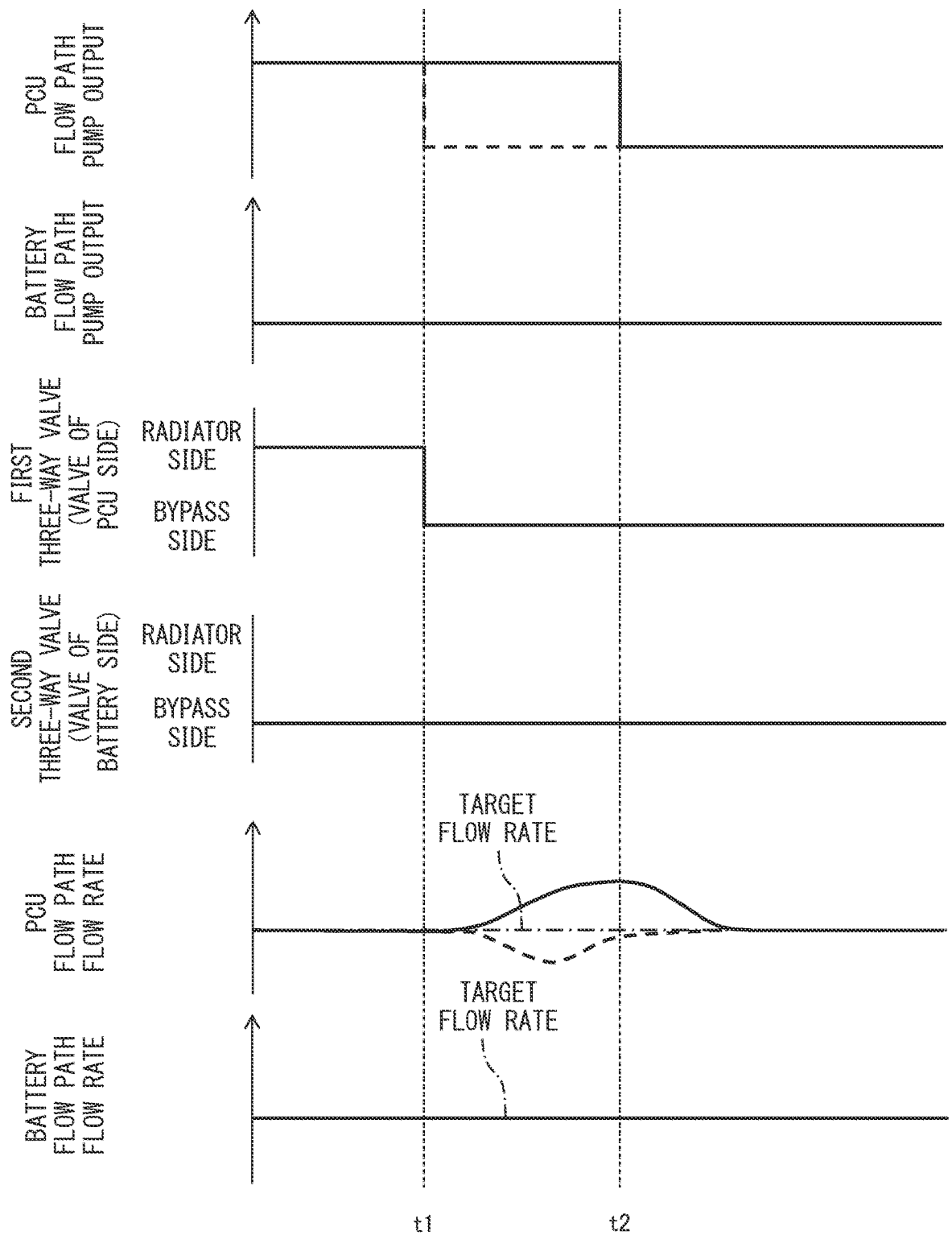
FIG. 26 is a time chart of output of the first pump, etc., in the case of switching a flow state of the cooling water from the flow state B to the flow state D.

FIG. 26 is a time chart of the output of the first pump 31, etc., in the case of switching the flow state of the cooling water at the low temperature circuit 3 from the flow state B (FIG. 10) to the flow state D (FIG. 12). As shown in FIG. 26, in the present embodiment, at the time t1, the first three-way valve 38 is switched from the low temperature radiator flow path 3*a* side to the PCU bypass flow path 3*d* side, then, at the time t2, the output of the first pump 31 is lowered. As a result, as shown in FIG. 26 by the solid lines, the flow rate of the PCU flow path 3*b* is temporarily larger than the target flow rate, and accordingly an excessive rise in temperature of the element of the PCU 118 is suppressed.

Figure 27:
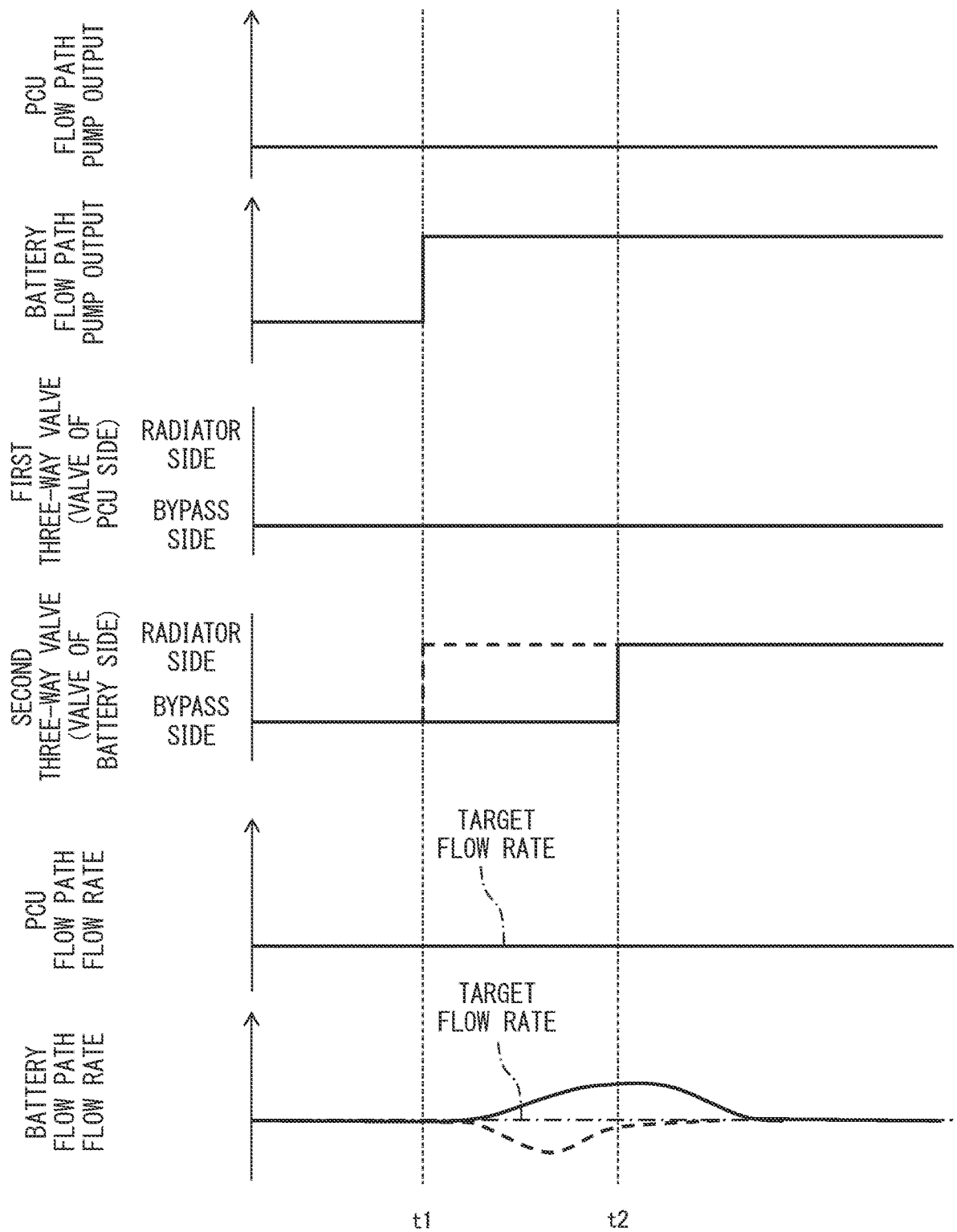
FIG. 27 is a time chart of output of the first pump, etc., in the case of switching a flow state of the cooling water from the flow state D to the flow state C.

FIG. 27 is a time chart of the output of the first pump 31, etc., in the case of switching the flow state of the cooling water at the low temperature circuit 3 from the flow state D (FIG. 12) to the flow state C (FIG. 11). As shown in FIG. 27, in the present embodiment, before the second three-way valve 39 is switched from the battery bypass flow path 3*e* side to the low temperature radiator flow path 3*a* side at the time t2, the output of the second pump 32 is raised at the time t1. As a result, as shown in FIG. 27 by the solid lines, the flow rate of the battery flow path 3*c* can be temporarily increased over the target flow rate.

Figure 28:
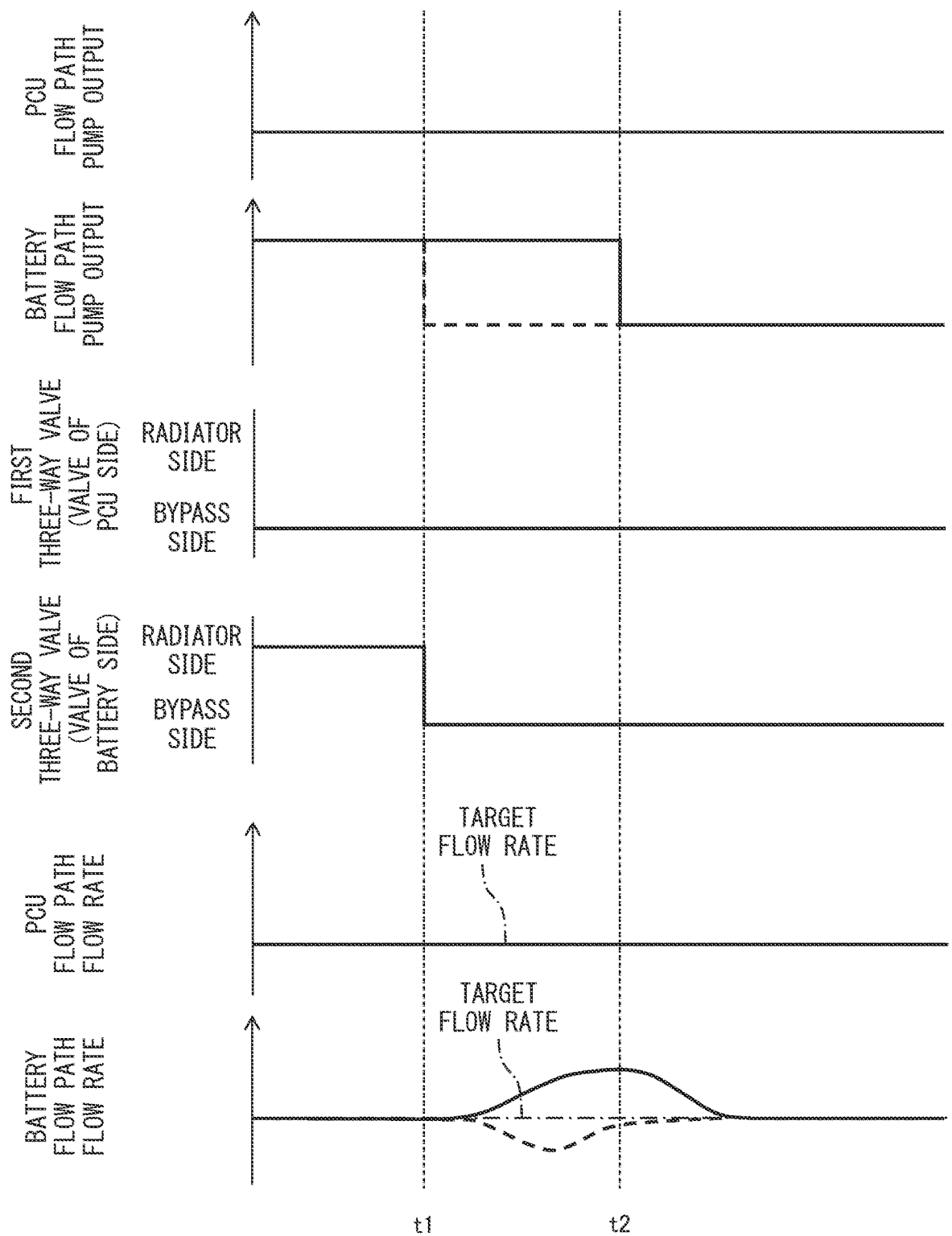
FIG. 28 is a time chart of output of the first pump, etc., in the case of switching a flow state of the cooling water from the flow state C to the flow state D.

FIG. 28 is a time chart of the output of the first pump 31, etc., in the case of switching the flow state of the cooling water at the low temperature circuit 3 from the flow state C (FIG. 11) to the flow state D (FIG. 12). As shown in FIG. 28, in the present embodiment, after the second three-way valve 39 is switched from the low temperature radiator flow path 3*a* side to the battery bypass flow path 3*e* side at the time t1, the output of the second pump 32 is lowered at the time t2. As a result, as shown in FIG. 28 by the solid lines, the flow rate of the battery flow path 3*c* can be temporarily increased over the target flow rate.

Action and Effects

In this regard, when switching the flow state of the cooling water at the low temperature circuit 3 between a first state (that is, the flow state A) and a second state (that is, the flow states B, C, and D), the flow rate of the cooling water flowing through the PCU flow path 3b changes along with switching of the flow state. For this reason, in some cases, the flow rate of the cooling water flowing through the PCU flow path 3b may temporarily become small.

According to the present embodiment, the outputs of the first pump 31 and the second pump 32 are controlled so that the flow rate of the cooling water flowing through the PCU flow path 3b temporarily is larger than the target flow rate (FIGS. 17 to 22). In more detail, in the present embodiment, the outputs of the first pump 31 and the second pump 32 are controlled so that when switching the flow state from the first state to the second state, the flow rate of the cooling water flowing through the PCU flow path 3b after switching the flow state temporarily becomes larger than the target flow rate after switching the flow state, and so that, when switching the flow state from the second state to the first state, the flow rate of the cooling water flowing through the PCU flow path 3b before switching the flow state temporarily becomes larger than the target flow rate after switching the flow state. Therefore, in the present embodiment, even when switching the flow state between when the flows of cooling water flowing through the two paths of the PCU flow path 3b and battery flow path 3c both flow through the low temperature radiator flow path 3a and when at least one of the flows of these cooling water does not flow through the low temperature radiator flow path 3a, the cooling water flowing through the PCU flow path 3b is kept from temporarily being small, and accordingly the element of the PCU 118 is kept from excessively rising in temperature.

Specifically, in the present embodiment, when switching the flow state of the cooling water at the low temperature circuit 3 from the second state to the first state, the flow state is switched after raising the output of the first pump 31 (FIGS. 17, 19, and 21). Further, when switching the flow state of the cooling water at the low temperature circuit 3 from the first state to the second state, the output of the first pump 31 falls after switching the flow state (FIGS. 18, 20, and 22).

Further, when switching the first three-way valve 38 between the low temperature radiator flow path 3a side and the PCU bypass flow path 3d side, the flow path resistance of the cooling water flowing through the PCU flow path 3b changes, and accordingly the flow rate of the cooling water flowing through the PCU flow path 3b changes along with switching of the first three-way valve 38. For this reason, in some cases, the flow rate of the cooling water flowing through the PCU flow path 3b may temporarily be small.

According to the present embodiment, the output of the first pump 31 is controlled so that when switching the first three-way valve 38 between the low temperature radiator flow path 3a side and the PCU bypass flow path 3d side, the flow rate of the cooling water flowing through the PCU flow path 3b temporarily be larger than the target flow rate. Therefore, in the present embodiment, even if switching the first three-way valve 38 between the low temperature radiator flow path 3a side and the PCU bypass flow path 3d side, the cooling water flowing through the PCU flow path 3b is kept from temporarily being smaller, and accordingly the element of the PCU 118 is kept from excessively rising in temperature.

Specifically, when raising the output of the first pump 31 in order to switch the flow path by the first three-way valve 38, the flow path is switched by the first three-way valve 38 after the output of the first pump 31 rises (FIGS. 19, 21, 23, and 25). Further, when lowering the output of the first pump 31 in order to switch the flow path by the first three-way valve 38, the output of the first pump 31 is lowered by the first three-way valve 38 after the flow path is switched (FIGS. 20, 22, 24, and 26).

Note that, when switching the flow state between the first state and the second state, if the flow rate of the cooling water flowing through the PCU flow path 3b is temporarily larger than the target flow rate around when switching the flow state, the outputs of the first pump 31 and the second pump 32 may be controlled in any way. If the flow rate of the cooling water flowing through the PCU flow path 3b is maintained larger than the target flow rate set at any timing in this way, the element of the PCU 118 is kept from excessively rising in temperature.

Specific Control

Figure 29:
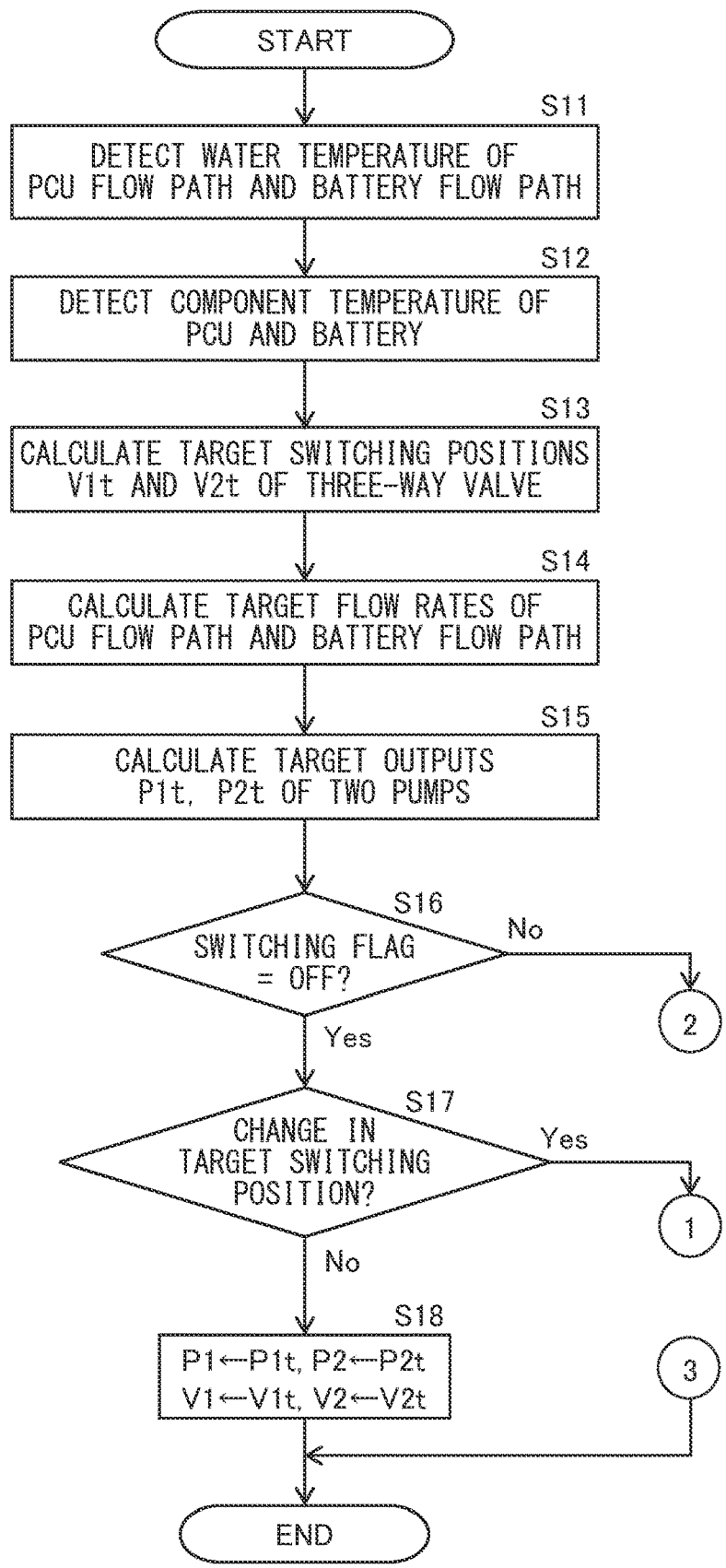
FIG. 29 is part of a flow chart showing a control routine controlling switching positions of a first three-way valve and second three-way valve and outputs of the first pump and second pump.
Figure 30:
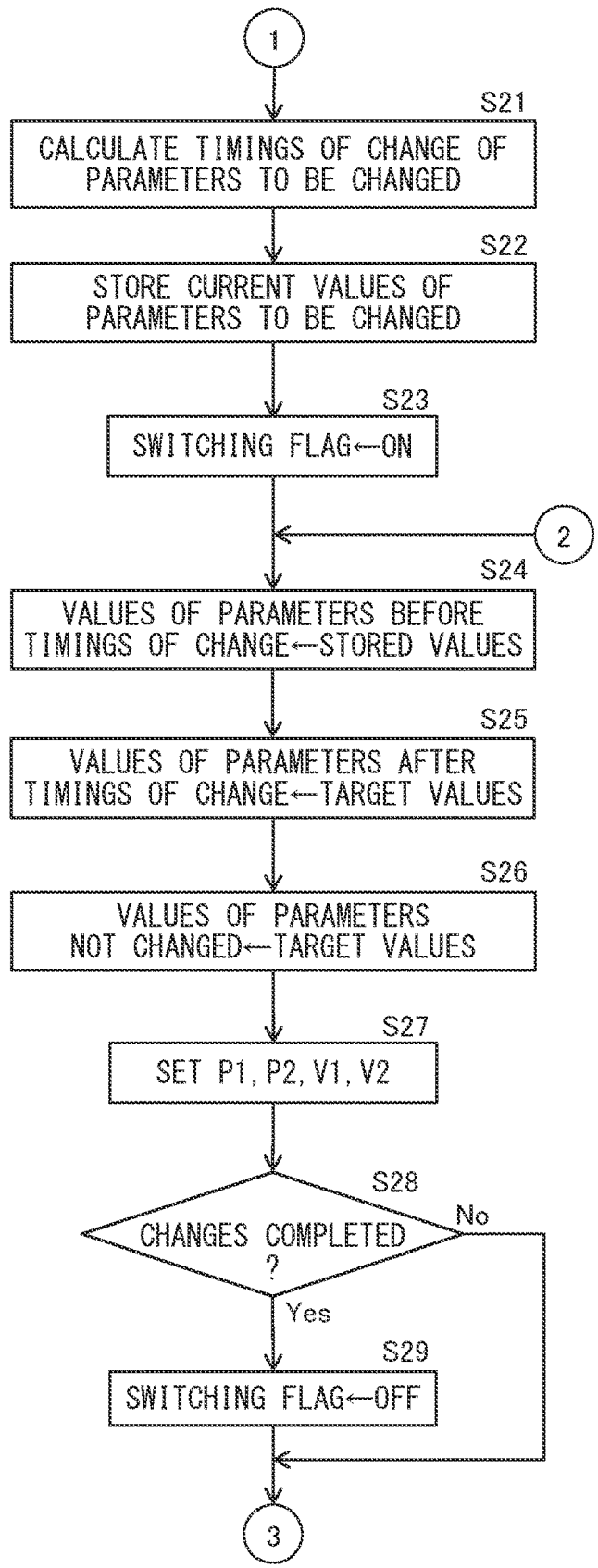
FIG. 30 is part of a flow chart showing a control routine controlling switching positions of a first three-way valve and second three-way valve and outputs of the first pump and second pump.
Figure 31A:
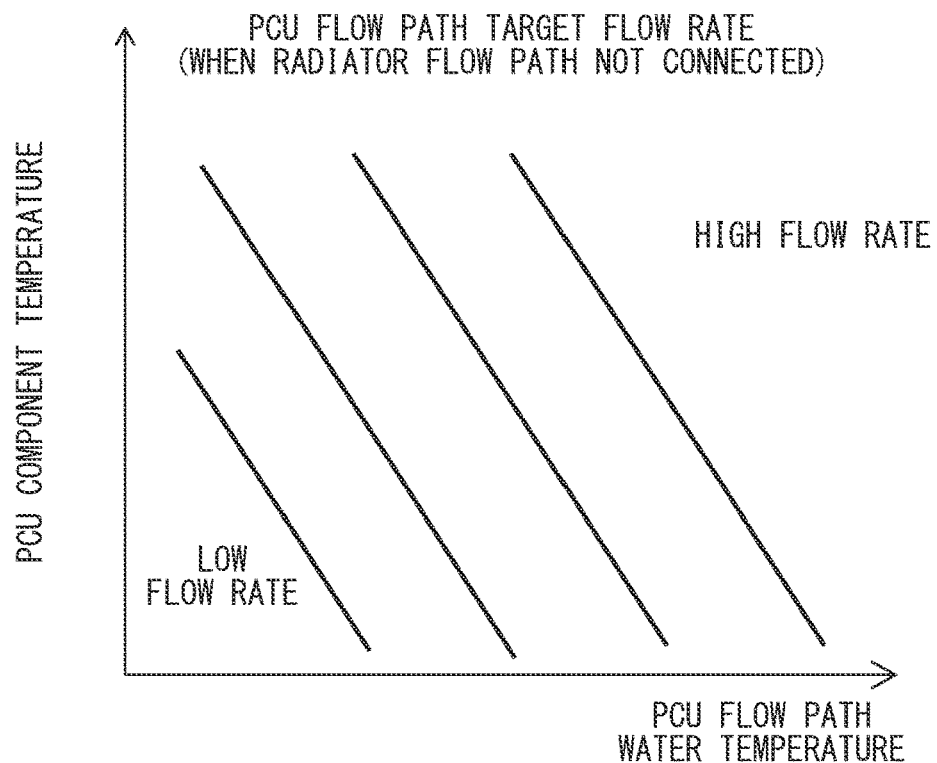
FIGS. 31A and 31B are views showing a technique of setting the target flow rate of the cooling water in the PCU flow path.
Figure 31B:
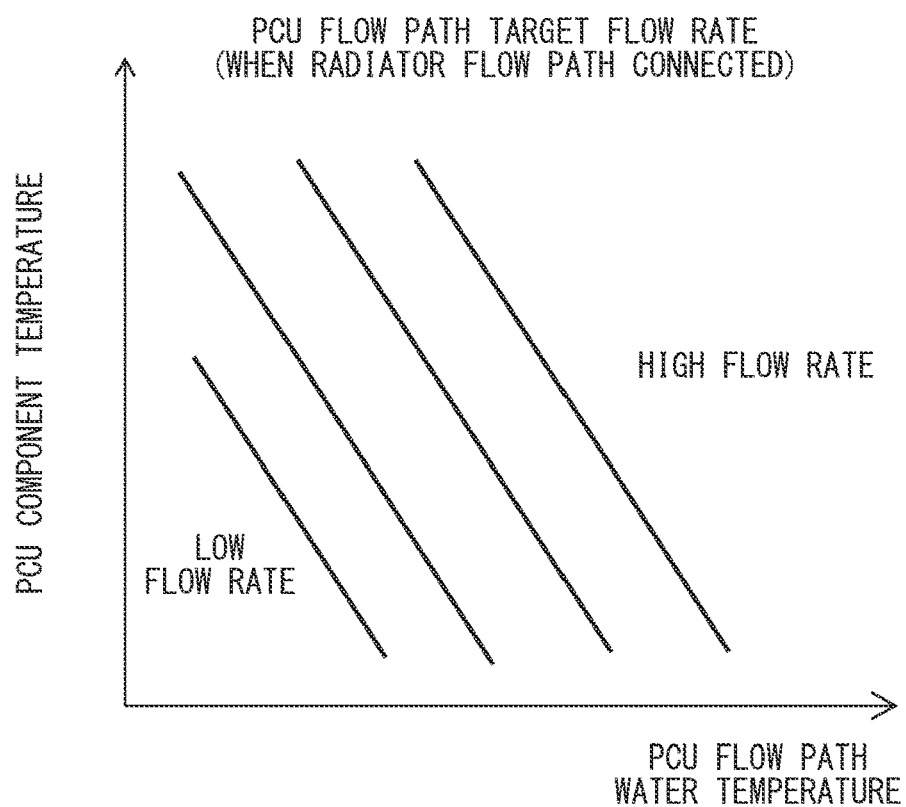
Figure 32A:
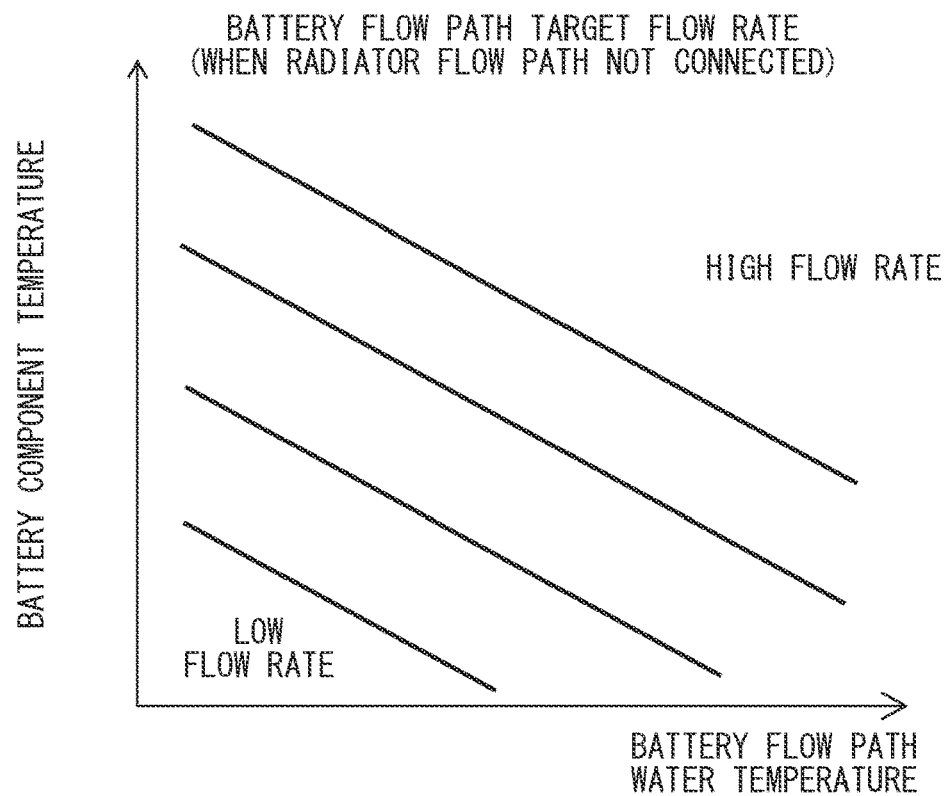
FIGS. 32A and 32B are views showing a technique of setting the target flow rate of the cooling water in the battery flow path.
Figure 32B:
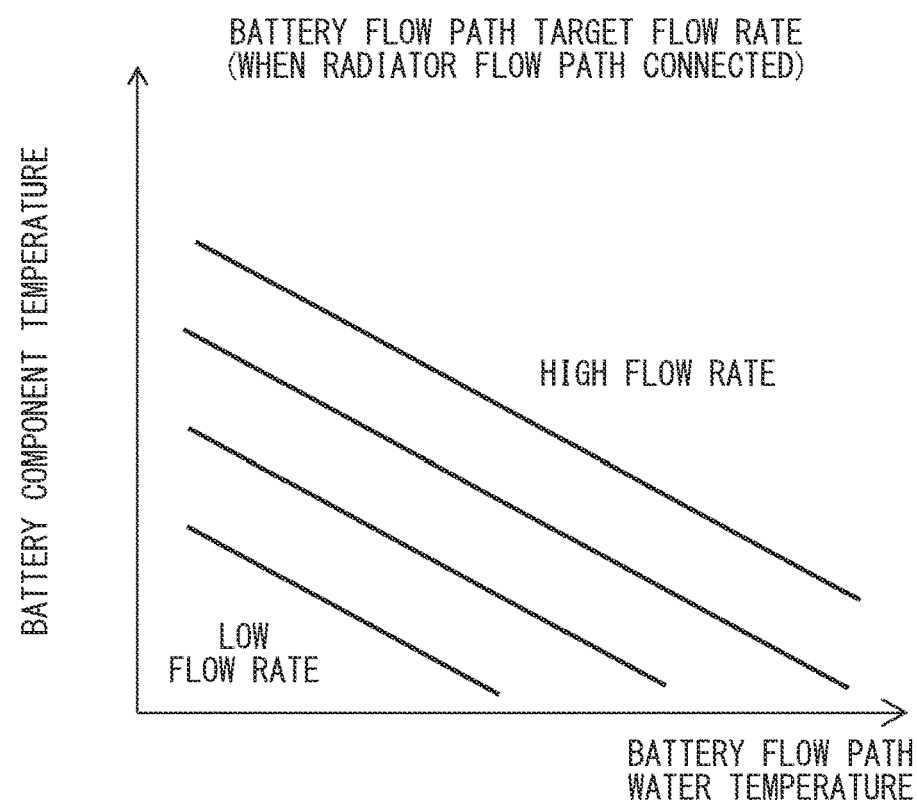

FIGS. 29 and 30 are flow charts showing a control routine for controlling the switching positions of the first three-way valve 38 and the second three-way valve 39 and the outputs of the first pump 31 and the second pump 32. The illustrated control routine is executed every certain time interval by the ECU 51.

First, at step S11, the temperature of the cooling water flowing through the PCU flow path 3b and the temperature of the cooling water flowing through the battery flow path 3c are respectively detected by the PCU water temperature sensor 55 and battery water temperature sensor 53. Next, at step S12, the element temperature of the PCU 118 and the element temperature of the battery are respectively detected by the PCU temperature sensor 54 and battery temperature sensor 52.

After that, at step S13, the target switching position V1t of first three-way valve 38 is calculated based on the temperature of the cooling water flowing through the PCU flow path 3b detected at step S11. In addition, the target switching position V2t of the second three-way valve 39 is calculated based on the temperature of the cooling water flowing through the battery flow path 3c detected at step S11.

Next, at step S14, using a map such as shown in FIG. 14A, the target flow rate at the PCU flow path 3b is calculated, based on the temperature of the cooling water flowing through the PCU flow path 3b detected at step S11 and the element temperature of the PCU 118 detected at step S12. In addition, using a map such as shown in FIG. 14B, the target flow rate in the battery flow path 3c is calculated, based on the temperature of the cooling water flowing through the battery flow path 3c detected at step S11 and the element temperature of the battery 120 detected at step S12.

Next, at step S15, using the maps such as shown in FIGS. 15A to 16C, the target output P1t of the first pump 31 and the target output P2t of the second pump 32 are calculated, based on the switching positions of the three-way valves 38, 39 calculated at step S13 and the target flow rate at the PCU flow path 3b and the target flow rate at the battery flow path 3c calculated at step S14.

Next, at step S16, it is judged if the switching flag has been set to OFF. The switching flag is set to ON while the three-way valve 38, 39 is switched and along with that the output of the first pump 31 or the second pump 32 is changed, and is set to OFF at other cases. If at step S16 it is judged that the switching flag is set to OFF, the control routine proceeds to step S17.

At step S17, it is judged if the target switching positions of the three-way valves 38, 39 calculated at step S13 are changed from the current switching positions. If it is judged that the target switching positions have not been changed from the current switching positions, the control routine proceeds to step S18. At step S18, the output P1 of the first pump 31 is set to the target output P1t and the output P2 of the second pump 32 is set to the target output P2t. In addition, the switching position V1 of the first three-way valve 38 is set to the target switching position V1t, the switching position V2 of the second three-way valve 39 is set to the target switching position V2t, and the control routine is ended.

On the other hand, if at step S17 it is judged that the calculated target switching positions of the three-way valves 38, 39 have been changed from the current switching positions, the control routine proceeds to step S21.

At step S21, the timings of changes of the parameters (switching positions of the three-way valves 38, 39 and the outputs of the pumps 31, 32) changed by changing the switching positions of the three-way valves 38, 39 from the current switching positions to the target switching positions are calculated. The timings of changes of these parameters, as shown in FIGS. 17 to 28, are set in advance in accordance with the flow states of the cooling water at the low temperature circuit 3, etc., before and after the changes of the switching positions, and are stored as a map in the memory of the ECU 51. Therefore, the timings of changes of the parameters are calculated, using a map, based on the flow states of the cooling water at the low temperature circuit 3, etc., before and after the changes of the switching positions.

Next, at step S22, the current values of the parameters changed by changing the switching positions of the three-way valves 38, 39 from the current switching positions to the target switching positions are stored as stored values in the memory of the ECU 51. Next, at step S23, a switching flag is set to ON.

After that, at step S24, among the parameters changed by changing the switching positions of the three-way valves 38, 39, the values of the parameters still not reaching the timings of changes calculated at step S21 are set at the stored values stored at step S22. Next, at step S25, among the parameters changed by changing the switching positions of the three-way valves 38, 39, the values of the parameters already reaching the timings of changes are set at the target values calculated at steps S13 and S15. Next, at step S26, the values of the parameters not changed even if changing the switching positions of the three-way valves 38, 39 are set to the target values calculated at steps S13 and S15. Next, at step S27, based on the values of the parameters set at steps S24 to S26, the output P1 of the first pump 31, the output P2 of the second pump 32, the switching position V1 of the first three-way valve 38, and the switching position V2 of the second three-way valve 39 are set.

Next, at step S28, it is judged if the changes of the values of the parameters accompanying changes of the switching positions of the three-way valves 38, 39 have all been completed. If it is judged that the changes of the values of the parameters have not been completed, the control routine is ended.

If at step S23 the switching flag is set ON, at the next control routine, the control routine proceeds from step S16 to step S24, whereupon steps S24 to S27 are repeatedly performed. After that, if the changes of the values of all of the parameters changed by changing the switching positions of the three-way valves 38, 39 have been completed, at step S28 it is judged that the changes of the values of the parameters have been completed, and the control routine proceeds to step S29. At step S29, the switching flag is set to OFF, and the control routine is ended.

Above, preferred embodiments according to the present invention were explained, but the present invention is not limited to these embodiments and can be corrected and changed in various ways within the language of the claims.

For example, in the above embodiments, the target flow rate is set regardless of the switching positions of the first three-way valve 38 and the second three-way valve 39 (FIGS. 14A and 14B). However, for example, as shown in FIGS. 31A to 32B, it is also possible to change the relationship of the temperature of the cooling water and temperature of the element with the target flow rate of the cooling water, in accordance with the switching positions of these three-way valves 38, 39.

However, in this case as well, when changing the switching positions of the three-way valves 38, 39, the pumps 31, 32 are controlled in the same way as the above embodiments. Therefore, for example, even when changing the relationship of the temperature of the cooling water and temperature of the element and the target flow rate of the cooling water in accordance with the switching positions of the three-way valves 38, 39, when switching the flow state of the cooling water at the low temperature circuit 3 between the first state and the second state, the outputs of the first pump 31 and the second pump 32 are controlled so that the flow rate of the cooling water flowing through the PCU flow path 3b is temporarily larger than the target flow rate. Further, when the first three-way valve 38 is switched between the low temperature radiator flow path 3a side and the PCU bypass flow path 3d side, the output of the first pump 31 is controlled so that the flow rate of the cooling water flowing through the PCU flow path 3b is temporarily larger than the target flow rate.

The invention claimed is:

1. A cooling system mounted in a vehicle provided with a motor for driving the vehicle, an inverter for controlling the motor, and a battery for supplying electric power to the motor, the cooling system comprising:
    a shared flow path;
    a first flow path connected to the shared flow path and having a first pump and a first heat exchanger exchanging heat with the inverter, wherein when the first pump is operating, a heat medium circulates through the first heat exchanger;
    a second flow path connected to the shared flow path in parallel with the first flow path and having a second pump and a second heat exchanger exchanging heat with the battery, wherein when the second pump is operating, the heat medium circulates through the second heat exchanger; and
    a control device controlling operations of the first pump and the second pump,
    wherein the first flow path and the second flow path are configured to be able to switch a flow state between a first state where the heat medium flowing through the first flow path and the second flow path both flow through the shared flow path, and a second state where at least one of the heat medium flowing through the first flow path and the second flow path does not flow through the shared flow path, and
    wherein the control device controls the outputs of the first pump and the second pump so that when switching the flow state between the first state and the second state, flow rate of the heat medium flowing through the first flow path becomes temporarily larger than a target flow rate.

2. The cooling system according to claim 1, wherein the control device controls the outputs of the first pump and the second pump so that when switching the flow state from the first state to the second state, the flow rate of the heat medium flowing through the first flow path after switching the flow state temporarily becomes larger than the target flow rate after switching the flow state, and when switching the flow state from the second state to the first state, the flow rate of the heat medium flowing through the first flow path before switching the flow state temporarily becomes larger than the target flow rate after switching the flow state.

3. The cooling system according to claim 1, wherein when switching the flow state from the second state to the first state, the control device switches the flow state after raising the output of the first pump.

4. The cooling system according to claim 1, wherein when switching the flow state from the first state to the second state, the control device lowers the output of the first pump after switching the flow state.

5. The cooling system according to claim 1, wherein the shared flow path is provided with a radiator exchanging heat with the outside air.

6. The cooling system according to claim 5, further comprising a first bypass flow path connected to the first flow path so as to bypass the shared flow path, and a first switching valve able to switch the flow path through which the heat medium flowing through the first heat exchanger flows, between the shared flow path and the first bypass flow path.

7. The cooling system according to claim 6, wherein when switching the flow path through which the heat medium flowing through the first heat exchanger flows by the first switching valve between the shared flow path and the first bypass flow path, the control device controls the output of the first pump so that the flow rate of the heat medium flowing through the first flow path temporarily becomes larger than the target flow rate.

8. The cooling system according to claim 7, wherein when raising the output of the first pump when switching the flow path by the first switching valve, the control device switches the flow path by the first switching valve after raising the output of the first pump.

9. The cooling system according to claim 7, wherein when lowering the output of the first pump when switching the flow path by the first switching valve, the control device lowers the output of the first pump after switching the flow path by the first switching valve.

10. The cooling system according to claim 6, wherein the control device switches the first switching valve based on the element temperature of the inverter.

11. The cooling system according to claim 5, further comprising a second bypass flow path connected to the second flow path so as to bypass the shared flow path, and a second switching valve able to switch the flow path through which the heat medium flowing through the second heat exchanger flows, between the shared flow path and the second bypass flow path.

12. The cooling system according to claim 11, wherein the control device switches the second switching valve based on the element temperature of the battery.

* * * * *